United States Patent
Abrahamson et al.

(10) Patent No.: US 10,903,480 B2
(45) Date of Patent: Jan. 26, 2021

(54) LEAD-ACID BATTERY ELECTRODE MANUFACTURE

(71) Applicant: ARCACTIVE LIMITED, Christchurch (NZ)

(72) Inventors: John Abrahamson, Christchurch (NZ); Shane Christie, Christchurch (NZ); Euan Scott Heffer, Christchurch (NZ); Hannu Out, Christchurch (NZ); Aimee Pavitt, Christchurch (NZ); Grigory Isaac Titelman, Christchurch (NZ); Yoon San Wong, Christchurch (NZ)

(73) Assignee: ARCACTIVE LIMITED, Christchurch (NZ)

( * ) Notice: Subject to any disclaimer, the term of this patent is extended or adjusted under 35 U.S.C. 154(b) by 278 days.

(21) Appl. No.: 16/061,005

(22) PCT Filed: Dec. 9, 2016

(86) PCT No.: PCT/IB2016/057459
§ 371 (c)(1),
(2) Date: Jun. 11, 2018

(87) PCT Pub. No.: WO2017/098444
PCT Pub. Date: Jun. 15, 2017

(65) Prior Publication Data
US 2018/0366719 A1    Dec. 20, 2018

(30) Foreign Application Priority Data
Dec. 11, 2015   (NZ) ........................................ 715083

(51) Int. Cl.
*H01M 4/04*       (2006.01)
*H01M 4/22*       (2006.01)
(Continued)

(52) U.S. Cl.
CPC ........... *H01M 4/0416* (2013.01); *B29C 70/50* (2013.01); *H01M 4/043* (2013.01); *H01M 4/20* (2013.01);
(Continued)

(58) Field of Classification Search
CPC ...... H01M 4/0416; H01M 4/20; H01M 4/043; H01M 4/21; H01M 4/22; H01M 10/12
See application file for complete search history.

(56) References Cited

U.S. PATENT DOCUMENTS

| 5,160,659 A | 11/1992 | von Benda et al. |
| 2003/0035998 A1* | 2/2003 | Zguris ..................... H01M 4/20 |
| | | 429/225 |

FOREIGN PATENT DOCUMENTS

| JP | 02177258 A | 7/1990 |
| JP | 02234354 A | 9/1990 |
| | (Continued) | |

*Primary Examiner* — Olatunji A Godo
(74) *Attorney, Agent, or Firm* — Dann, Dorfman, Herrell and Skillman. P.C.

(57) ABSTRACT

A method for impregnating an active paste into a fibre material in the manufacture of an electrode of a lead acid battery or cell, comprises moving a fibre material through a confined pasting zone also containing a Pb-based paste, while vibrating and maintaining a pressure on the paste, to continuously impregnate the paste into the fibre material. A paste impregnating machine is also disclosed, with a fibre material feed system, and which may use a lug along the fibre material to draw the fibre material through the paste application stage.

25 Claims, 20 Drawing Sheets

(51) Int. Cl.
    *H01M 4/20*     (2006.01)
    *B29C 70/50*     (2006.01)
    *H01M 4/21*     (2006.01)
    *H01M 10/12*     (2006.01)
    H01M 4/68     (2006.01)
    H01M 4/74     (2006.01)
    B29C 70/88     (2006.01)
    B29K 103/06     (2006.01)
    B29K 307/04     (2006.01)
    B29L 31/34     (2006.01)

(52) U.S. Cl.
    CPC ............... *H01M 4/21* (2013.01); *H01M 4/22* (2013.01); *H01M 10/12* (2013.01); *B29C 70/882* (2013.01); *B29K 2103/06* (2013.01); *B29K 2307/04* (2013.01); *B29L 2031/3468* (2013.01); *H01M 4/68* (2013.01); *H01M 4/74* (2013.01); *H01M 2220/20* (2013.01)

(56) References Cited

FOREIGN PATENT DOCUMENTS

| | | |
|---|---|---|
| JP | 06119924 A | 4/1994 |
| WO | 2011078707 A1 | 6/2011 |
| WO | 2013133724 A9 | 9/2013 |
| WO | 2014046556 A1 | 3/2014 |
| WO | WO2016092510 * | 6/2016 |

\* cited by examiner

LEAD-ACID BATTERY ELECTRODE MANUFACTURE

FIELD OF THE INVENTION

The invention relates to lead-acid battery electrode manufacture, including an improved method and apparatus for pasting fibre electrodes for use in the manufacture or construction of lead-acid batteries, particularly but not exclusively automotive batteries for hybrid vehicles.

BACKGROUND

Fibrous material, that can be conductive such as carbon fibre material or non-conductive, can be used in electrodes of lead-acid batteries. Our international patent application publications WO2011/078707 and WO2013/133724 disclose Pb-acid batteries comprising as a current collector a conductive fibre material such as carbon fibre material with low interfibre spacing and improved battery performance.

During electrode manufacture carbon fibre material can be difficult to paste. The paste may not sufficiently penetrate through the material, resulting in poor battery performance.

Also, technologies for high volume manufacture of lead-acid batteries comprising fibre electrodes, whether conductive or non-conductive, are required.

U.S. Pat. No. 5,160,659 discloses a vibro-inflitration process for inserting an active material paste into an electrode body.

Our international patent application publication WO2014/046556 discloses a method for forming an electrical connection to a microscale electrically conductive fibre material electrode element, by pressure impregnating into the fibre material an electrically conductive lug material, and provides a lug for external connection of the electrode element.

Impregnating active paste into electrode fibre materials having an interfibre spacing of about 100 microns or less, continuously (or semi-continuously) at a production speed of about 10 mm/second or more, can be problematic. This is particularly so where the paste has a relatively high yield stress, which must be overcome to impregnate the paste into the fibre material.

SUMMARY OF INVENTION

It is an object of at least some embodiments of the invention to provide improvements or at least alternatives for use in the manufacture of Pb-acid batteries comprising fibre electrodes, particularly but not necessarily exclusively Pb-acid batteries for use in hybrid vehicles.

Electrode Pasting Method

In broad terms in one aspect the invention may comprise a method for impregnating an active paste into a fibre material in the manufacture of an electrode of a lead acid battery or cell, which comprises moving a fibre material having an interfibre spacing up to 100 microns, through a confined pasting zone of a paste application stage or vice versa, also containing in the confined pasting zone a Pb-based particle paste, while vibrating the paste in the confined pasting zone and maintaining a pressure on the vibrating paste to continuously impregnate the paste through a major surface of the moving fibre material and into and through the fibre material.

In broad terms in another aspect the invention may comprise a method for impregnating an active paste into a fibre material in the manufacture of an electrode of a lead acid battery or cell, which comprises moving a fibre material having a solids volume fraction of greater than 1%, through a confined pasting zone of a paste application stage or vice versa, also containing in the confined pasting zone a Pb-based particle paste, while vibrating the paste in the confined pasting zone and maintaining a pressure on the vibrating paste to continuously impregnate the paste through a major surface of the moving fibre material and into and through the fibre material.

In some embodiments, the method comprises continuously supplying paste to the confined pasting zone of the paste application stage and applying the pressure on the vibrating paste through the paste supply.

In some embodiments the solids volume fraction may be greater than 2% or greater than 3% or greater than 4% or greater than 5%.

In some embodiments the method comprises the confined pasting zone of the paste application stage having length in a direction of relative movement between the fibre material and the paste application stage (a machine direction) and a cross-section area across the direction of relative movement which reduces in the direction of relative movement. The confined pasting zone may have length in a machine direction, a width across the machine direction, and a height perpendicular to the plane of the fibre material which reduces in the machine direction. The confined pasting zone may have an entry across the machine direction and a smaller slot-shaped exit across the machine direction.

In some embodiments the fibre material has a thickness of at least 0.5 mm and which includes moving the fibre material past the paste application stage at a speed of at least 0.01 meters/second.

In some embodiments the paste has yield stress in the range about 5 to about 500 Pa and/or a plastic viscosity in the range about 0.1 to about 5 Pa s.

Typically the method includes allowing air to escape from within the fibre material during pasting.

In some embodiments the method includes compressing the fibre material while impregnating the fibre material.

The method includes subjecting the paste to pressure sufficient to overcome flow resistance of the fibres to the paste, frictional flow resistance on the fibres to the paste and paste surface tension forces. In some embodiments the method includes subjecting the paste to gauge pressure above 0 kPa, preferably of at least 0.2 kPa. In some embodiments the method includes subjecting the paste to gauge pressure up to 100 kPa. In some embodiments the method includes subjecting the paste to pressure in the range 0.2 kPa to 100 kPa.

In some embodiments the method includes vibrating the paste by subjecting the paste to ultrasound vibration. In some embodiments the method includes subjecting the paste to vibration of a frequency in the range 5 to 500 kHz and a power of at least 250 W/kg of Pb particle paste.

Typically the method comprises moving the continuous length of fibre material past the paste application stage. The 'moving' may comprise moving the fibre material either at a substantially steady speed, or in steps.

In some embodiments the method comprises drawing the fibre material under tension past the paste application stage by drivers arranged to grip the fibre material on either side of at least one lengthwise extending electrically conductive lug in the fibre material. In some embodiments the method comprises before contacting the fibre material with the paste, forming in the fibre material an electrically conductive lug of higher tensile strength in the machine direction than the fibre material, along a length of the fibre material. In some embodiments the method comprises after drawing the fibre material through the paste application stage, any one or more of the following processes in any sequence: cutting the pasted fibre material to form multiple individual electrode elements; drying the pasted fibre material; cleaning any lug of any paste; scraping and/or rolling the pasted fibre material to a desired electrode thickness and/or desired thickness of over-paste; adding an over paste to the pasted fibre material; and/or trimming or stamping any lug of any excess lug material and/or to cut out any lug material from the lug.

In some embodiments the paste has a yield stress in the range about 5 to about 500 Pa and/or a plastic viscosity in the range about 0.1 to about 5 Pa s.

In some embodiments the fibre material is electrically conductive. In some embodiments the fibre material may be non-conductive. In some embodiments the fibre material comprises a non-woven material. In some embodiments the fibre material comprises a carbon fibre material. In some embodiments the fibre material comprises an Oxidised Polyacrylonitrile (PAN) Fabric (OPF). In some embodiments the fibre material comprises glass fibres. In some embodiments the fibre material comprises a silicon fibre material.

The paste also comprises a fluid such as water, an acid and/or an alcohol. In some embodiments the acid is dilute sulphuric acid. In some embodiments the alcohol is ethanol.

In some embodiments the method comprises removing paste from upper and lower surfaces of the fibre material before drying the paste or allowing the paste to dry.

The method may comprise maintaining the fibre material under tension, preferably a tension less than the tensile strength of the fibre material, for example a tension of at least about 20 kN/m$^2$ or at least about 30 kN/m$^2$, or least about 40 kN/m$^2$ or at least about 50 kN/m$^2$ or at least about 60 kN/m$^2$ while contacting the fibre material with the paste. The tension may be measured across the width of the fabric in the machine direction, or substantially perpendicular to the machine direction (being along the length of the fibre material) or in both directions. The method may comprise moving the fibre material through the paste at a speed of at least about 5 mm/second, or at least about 10 mm/second or at least about 15 mm/second Electrode Pasting Machine In broad terms in a further aspect the invention comprises a machine for impregnating an active paste comprising Pb-based particles into a fibre material in the manufacture of an electrode of a lead acid battery or cell, which comprises a paste application stage comprising a confined pasting zone thereof, a fibre material feed system arranged to move the fibre material through the confined zone, a vibrator to vibrate the paste in the confined volume, and a pressure supply arranged to maintain pressure on the vibrating paste, to continuously impregnate the paste through a major surface of the moving fibre material and into and through the fibre material.

In some embodiments the confined volume of the paste application stage has length in a direction of relative movement between the fibre material and the paste application stage (a machine direction) and a cross-section area across the direction of relative movement which reduces in the direction of relative movement. In some embodiments the confined pasting zone has a length in a machine direction, a width across the machine direction, and a height perpendicular to the plane of the fibre material which reduces in the machine direction. In some embodiments the confined pasting zone has an entry across the machine direction and a smaller slot-shaped exit across the machine direction.

In some embodiments the machine may be arranged to compress the fibre material at entry of the fibre material into the confined zone of the paste application stage; compress the fibre material while impregnating the fibre material; and/or compress the fibre material at exit of the fibre material from the confined zone of the paste application stage.

Pasted Electrode Product

The invention in broad terms may comprise a lead-acid battery or cell including at least one electrode comprising as a fibre material comprising, when fully charged, a mass loading of lead (or Pb equivalent) impregnated into the fibre material of at least about 1.8 gm/cm$^3$ of internal volume of the fibre material, substantially evenly distributed through a thickness and across a width and length of the fibre material, with an average depth of any skin of paste (that is, a layer of paste that sits on top of the fabric) on a major face of an exterior surface of the fibre material less than about 1 mm or less than about 0.5 mm.

Preferably there is a mass loading of lead (or Pb equivalent) of at least about 2.0 gm/cm$^3$ or at least about 2.2 gm/cm3 or at least about 3 gm/cm3 or between about 1.8 and 5 gm/cm$^3$ or between about 2 and 4.5 gm/cm3 or between about 2.4 and 4 gm/cm$^3$ of internal volume of the fibre material, substantially evenly distributed through the fibre material.

Preferably any variation in the mass loading of lead (or Pb equivalent) per cm3 of internal volume of the fibre material is less than 50% or less than 30% or less than 20%.

Preferably greater than about 50% or greater than about 65% or greater than about 80% of (the total volume of) paste impregnated into and on a surface or surfaces of the fibre material is in the internal volume of the fibre material.

Manufacturing Equipment

The invention in broad terms may also comprise a machine for impregnating a paste into a fibre material in the manufacture of an electrode of a lead-acid battery or cell, comprising:

a fibre material feed system to feed the continuous fibre material into and from a paste application stage and maintain the fibre material under tension, and a paste application stage arranged to subject paste to pressure and vibrate the paste to impregnate the paste into the fibre material.

In at least some embodiments the fibre material feed system comprises drivers on an exit side of the confined pasting zone to draw the fibre material in a machine direction through the paste application stage under tension, and arranged to contact opposite faces of the fibre material along at least one lengthwise part of the fibre material having a width across the machine direction less than half of the width of the fibre material, and which lengthwise part of the fibre material has higher tensile strength in a length or machine direction than another part of the fibre material.

In at least some embodiments the drivers are arranged to grip the fibre material on either side of at least one lengthwise extending conductive lug in the fibre material, for example at or near a lengthwise edge of the fibre material. In at least some embodiments the drivers are arranged to grip the fibre material on either side of two lengthwise extending conductive lugs in the fibre material, at or near opposite lengthwise edges of the fibre material.

In at least some embodiments the pasting machine is preceded in the machine direction by a lug forming machine arranged to form at least one lengthwise extending electrically conductive lug in the fibre material at or near a lengthwise edge of the fibre material. In at least some embodiments the lug forming machine is arranged to form a lengthwise extending conductive lug attached to the fibre material at or near opposite lengthwise edges of the fibre material.

In at least some embodiments the pasting machine is followed in the machine direction by any one or more of the following in any sequence: a cutting machine arranged to cut the pasted fibre material into multiple smaller lengths of pasted fibre material; a dryer, such as a flash dryer, arranged to dry the pasted fibre material; a cleaning stage arranged to clean the conductive lug zone of any paste; scraping and/or rolling the pasted fibre material to a desired electrode thickness and/or desired thickness of over-paste; adding an over paste to the pasted fibre material; and a lug trimming/stamping machine arranged to trim any lug of any excess lug material and/or to cut out any lug material from the lug.

The invention in broad terms may also comprise apparatus for impregnating an active paste into a fibre material in the manufacture of an electrode of a lead-acid battery or cell, which comprises:

a lug forming machine arranged to form in a reduced width lug zone part of the fibre material, a length of a conductive material of higher tensile strength in a machine direction than a fibre material, connected to the fibre material, followed in the machine direction by a machine for continuously impregnating a paste into the fibre material by contacting the fibre material with the paste by drawing the continuous length of the fibre material through a paste application stage in the machine direction and simultaneously subjecting the paste to pressure and vibration applied to the paste or the fibre material or both, to impregnate the fibre material by the paste.

In at least some embodiments the lug forming machine is arranged to form the length of higher strength material by pressure impregnation of the higher strength material into the fibre material, and to surround and/or penetrate fibres of the fibre material, for example by moving the fibre material relative to a pressure injection stage or vice versa and by the pressure injection stage pressure impregnating the higher strength material while molten into the fibre material.

In at least some embodiments the lug forming machine is arranged to move the fibre material relative to the pressure injection stage or vice versa by carrying the fibre material on a heat sink conveyor.

In at least some embodiments the lug forming machine is arranged to, by the pressure injection stage, pressure impregnate the higher strength material into the fibre material by a series of pressure injection pulses during the relative movement between the fibre material and pressure injection stage so that multiple pressure injection pulses inject the higher strength material into different adjacent portions of the fibre material while forming the continuous length of the higher strength material along the fibre material.

In at least some embodiments the lug forming machine is arranged to form the length of a material of higher strength material at or near a length-wise edge of the fibre material and with a lug extension or extensions beyond the edge of the fibre material.

In at least some embodiments the pasting machine is followed by any one or more of the following in any sequence: a cutting stage, arranged to cut the pasted fibre material across, including across the higher strength material, to form multiple individual electrode elements or groups of electrode elements each with a lug for external electrical connection; a dryer, such as a flash dryer, arranged to dry the pasted fibre material; a cleaning stage arranged to clean the conductive lug of any paste; a scraping and/or rolling stage that scrapes and/or rolls the pasted fibre material to a desired electrode thickness and/or desired thickness of over-paste; an over-paste stage that adds an over paste to the pasted fibre material; and a lug trimming/stamping stage arranged to trim the lug, of any excess lug material, and/or to cut out any lug material from the lug.

The invention in broad terms may also comprise apparatus for manufacturing pasted electrodes of a lead-acid battery or cell, which comprises:

a machine for continuously impregnating a paste of an active material into a fibre material by contacting the fibre material with the paste by drawing a continuous length of the fibre material through a paste application stage in a machine direction and simultaneously subjecting the paste to pressure and vibration to impregnate the fibre material by the paste, followed in the machine direction by a dryer arranged to dry the pasted fibre material and/or a cutting stage arranged to cut the pasted fibre material across the machine direction to form multiple individual electrodes or groups of pasted electrodes.

The invention in broad terms may also comprise a method for manufacturing pasted electrodes for a lead-acid battery or cell, which comprises:

impregnating a paste of an active material into a fibre material by contacting the fibre material with the paste by drawing a continuous length of the fibre material through a paste application stage in the machine direction and simultaneously subjecting the paste to pressure and vibration to impregnate the fibre material with the paste, and subsequently drying the pasted fibre material, and/or cutting the pasted fibre material to form multiple individual electrodes or groups of electrodes, optionally followed by any one or more of the following in any sequence; cleaning a conductive lug of any paste; scraping and/or rolling the pasted fibre material to a desired electrode thickness and/or desired thickness of an over-paste; adding an over paste to the pasted fibre material; and/or trimming and/or stamping a conductive lug of any excess lug material and/or cutting out any lug material from the lug.

Definitions

In this specification:

'paste' means a wet soft mixture of fine solids suspended in a liquid, which is most often a shear-thinning fluid (as the paste is pumped or stirred more vigorously (higher shearing rate) it acts with a lower effective viscosity, i.e. becomes relatively easier to move; this may occur because the weak bonds between the particles are broken down and then take time to re-establish). Embodiments of paste may have a creamy consistency.

'active material' means a material comprising Pb-based particles, that are subsequently converted into Pb during formation charging of the battery.

'moving' includes moving (the fibre material through the paste or the paste relative to the fibre material) either at a substantially steady speed, or in steps.

'confined pasting zone' means a zone that contains both paste under pressure and moving fibre material passing through or alongside the paste, with paste moving into it under pressure; and 'confined zone' has a similar meaning.

'lug' means any electrically conductive element or connector which enables external electrical connection of the fibre electrode or of the active material paste within the fibre electrode or both.

'lug region' and 'lug zone' are used interchangeably and have the same meaning.

'matrix' in relation to a lug refers to lug material encapsulating the conductive or non-conductive fibre material in the lug zone in a 3-dimensional structure that has length, width and depth.

'mass loading' means the mass loading of lead or Pb equivalent as measured when the electrode is dry.

'comprising' as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

The invention is further described with reference to the accompanying figures by way of example wherein.

DETAILED DESCRIPTION OF PREFERRED EMBODIMENTS

Electrode Pasting

In the manufacture or construction of lead-acid battery electrodes as described herein, a fibre material has applied to it a Pb-based particle paste during a paste application stage. Preferably the paste comprises a mixture of leady oxide (Pb and PbO) and a fluid that may be selected from water, and/or an acid and/or an alcohol. Preferably the paste comprises a mixture of leady oxide (Pb and PbO) and water which may include sulphuric acid. This construction allows the acid in the paste or the acid in the electrolyte when the electrode is assembled into a battery to react with the leady oxide contained within the fibre material during and before cell formation (first charge and discharge cycle during which linkages occur between neighbouring particles), increasing the electrical conductivity and active surface area and thus the battery capacity. In some embodiments the fibre material has a thickness of at least 0.5 mm. During the paste application stage, the fibre material moves past and/or through the paste application stage at a speed of at about least 5 mm/second or at least about 10 mm/second. In some embodiments the paste has yield stress in the range about 5 to about 500 Pa and/or a plastic viscosity in the range about 0.1 to about 5 Pa s.

Typically the method includes allowing air to escape from within the fibre material during pasting.

In some embodiments the method includes compressing the fibre material while impregnating the fibre material.

The method includes subjecting the paste to pressure sufficient to overcome frictional flow resistance on the fibres to the paste and paste surface tension forces. In some embodiments the method includes subjecting the paste to gauge pressure above 0 kPa, preferably of at least 0.2 kPa.

In some embodiments the method includes subjecting the paste to gauge pressure up to 100 kPa. In some embodiments the method includes subjecting the paste to pressure in the range 0.2 kPa to 100 kPa.

In some embodiments the method includes vibrating the paste by subjecting the paste to ultrasound vibration. In some embodiments the method includes subjecting the paste to ultrasound vibration of a frequency in the range 5 to 500 kHz and a power of at least 250 W/kg of Pb particle paste.

Figure 3:
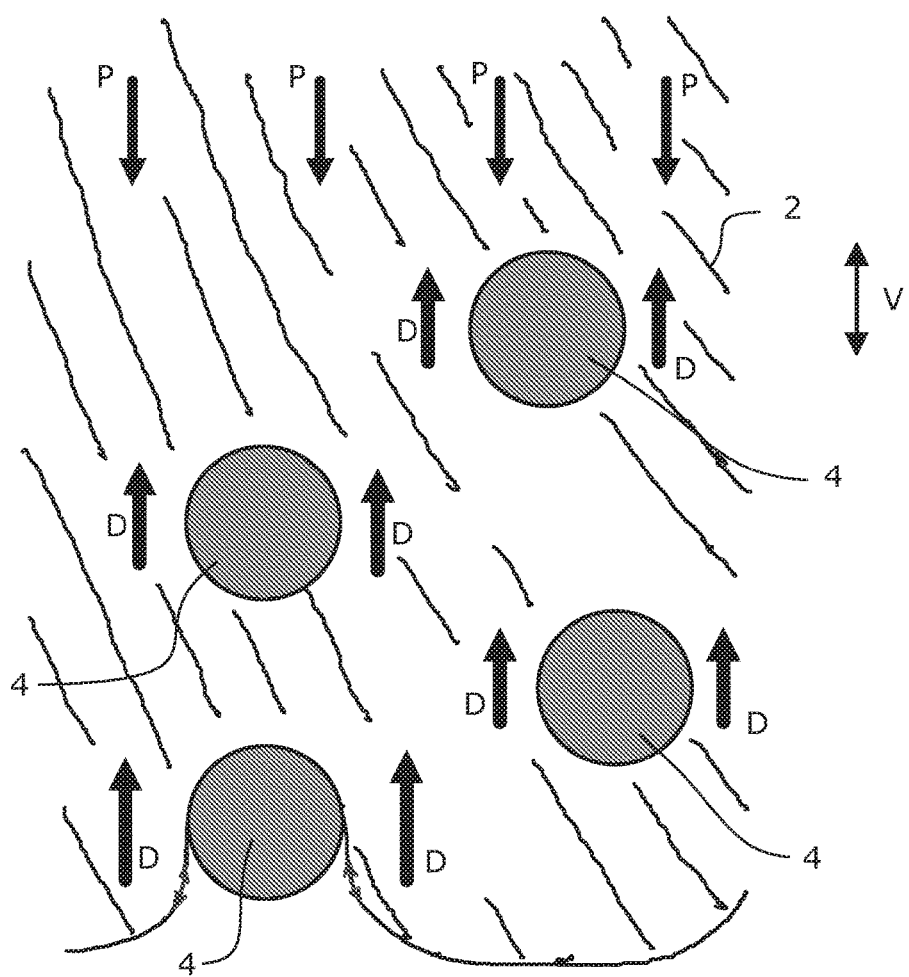

FIG. 3 schematically shows the microscale forces that need to be overcome for pasting. In accordance with the invention the paste is impregnated into the fibre material by subjecting the paste to pressure P to force the paste into the fibre material, and simultaneously vibrating the paste as indicated at V as the paste enters the fibre material to aid impregnation of the fibre material with the paste. The vibration may assist to fluidise the paste and the pressure must be sufficient to overcome the flow resistance or drag D of the fibres to the paste, and paste surface tension forces, so that under pressure the paste will flow into the fibre material and between the fibres of the microscale fibre material.

Figure 1:
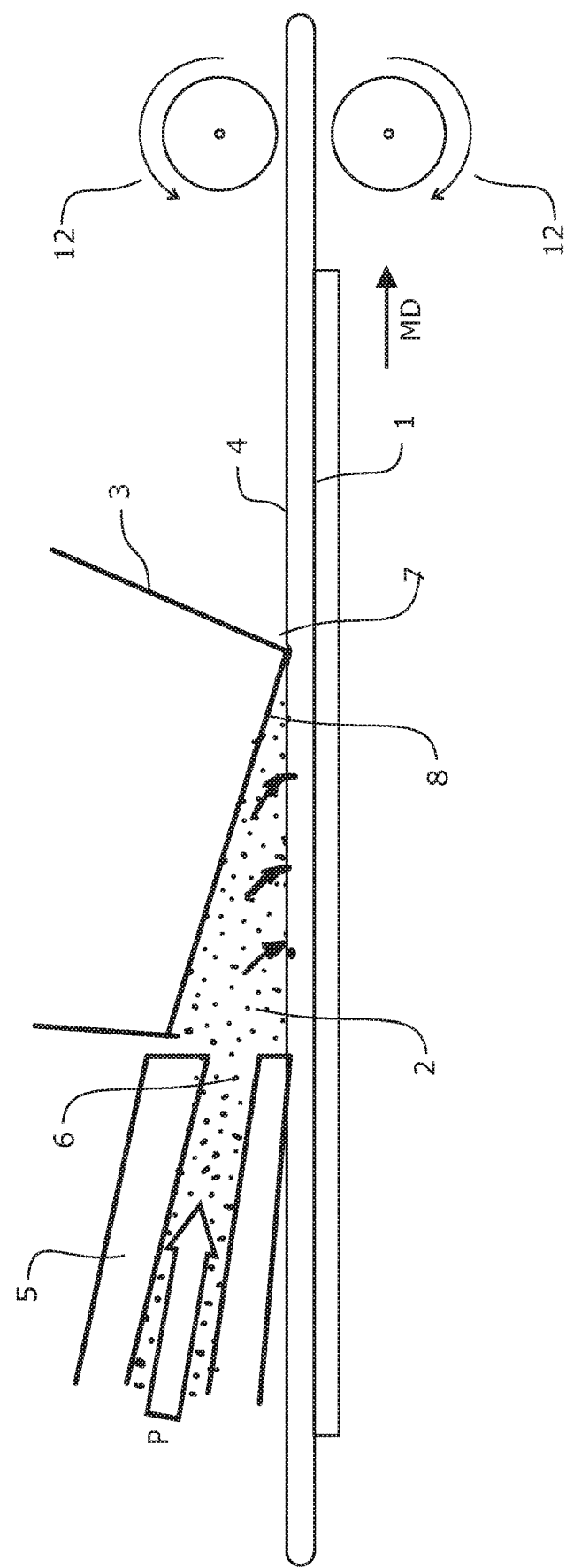
FIG. 1 schematically illustrates a first embodiment of an electrode paste impregnation stage of the invention.
Figure 2:
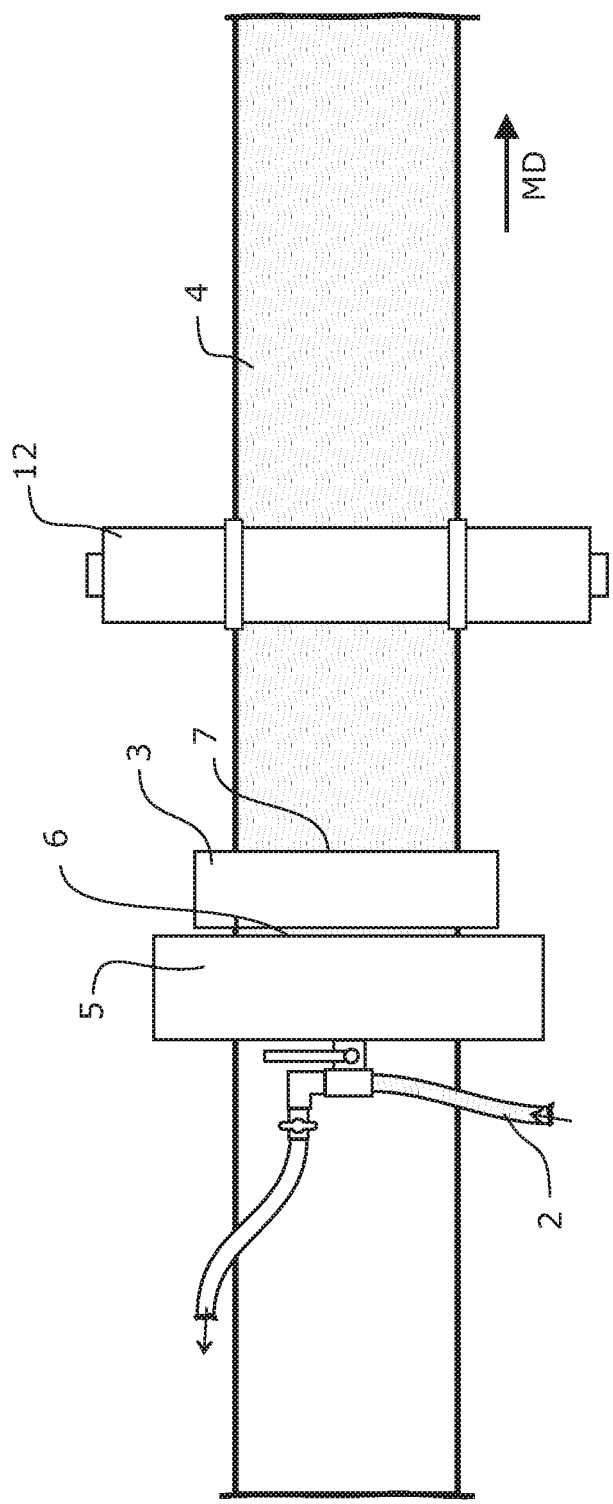
FIG. 2 is a plan view of the embodiment of an electrode paste impregnation stage of FIG. 1, FIG. 3 schematically shows microscale forces to overcome for pasting, FIG. 4 schematically illustrates a second embodiment of another electrode paste impregnation stage of the invention, FIG. 5 schematically illustrates a third embodiment of another electrode paste impregnation stage of the invention, FIG. 6 schematically illustrates a fourth embodiment of a further electrode paste impregnation stage of the invention, FIG. 7 comprises two images of cross-sections through strips of carbon fibre electrode material with good paste distribution through the internal voidage of the material achieved by an embodiment of an electrode paste impregnation method of the invention.

FIG. 1 schematically illustrates an embodiment of an electrode paste impregnation stage of the invention and FIG. 2 is a plan view of the embodiment of an electrode paste impregnation stage of FIG. 1. A continuous length of thin sheet fibre material 4 such as carbon fibre material moves through/past the paste application stage in a machine direction indicated by arrow MD, for example by being drawn by driven rollers 12, either at a substantially steady speed, or in steps. The fibre material moves over a surface 1 such as a flat plate. Paste is delivered onto the fibre material 4 opposite the surface 1, from a paste supply (not shown) through paste delivery outlet 5 comprising in particular an orifice 6 which is at least as wide across the machine direction as the width of the fibre material 4, but on other embodiments may be of slightly less width to allow for slight paste spread width-wise across the fibre material. Immediately forward of the paste delivery outlet 5 in the machine direction is a vibrator 3, having a lower surface 8. The lower surface 8 extends across the fibre material 4 and angles downwardly towards the fibre material in the machine direction as shown. A confined pasting zone is defined forward of the orifice 6, between the underside 8 of the vibrator 3 and the surface 1. The cross-section area (approximately triangular in cross-section in the embodiment shown) of the confined pasting zone, in the machine direction, reduces in the machine direction as shown. Alternatively stated, the confined pasting zone has a height perpendicular to the plane of the surface 1/fibre material 4 which reduces in the machine direction. Between the forward edge of the underside 8 of the vibrator 3, and the surface 1, as indicated at 7, is a smaller slot-shaped exit across the machine direction, than the entry into the confined pasting zone at the paste delivery orifice 6. This slot may be provided with a scraper or blade or similar to remove any excess paste that may be present and/or to maintain the fibre material with an even surface across the plane of the exiting fabric. In an alternative embodiment the stationary surface 1 may be replaced by a moving conveyor which may comprise for example an impervious belt such as a flexible stainless steel mesh belt or a perforated flexible stainless steel plate, or similar.

In use, as the fibre material 4 moves forward in the machine direction, paste moving under pressure as indicated by arrow P is continuously delivered under pressure from orifice 6 into the confined pasting zone defined between the lower face 8 of the vibrator 3 and the surface 1 beneath it, and left and right side walls on either side of the confined pasting zone. The paste is delivered under a pressure for example pumping pressure, which maintains a static pressure on the wedge-shaped body of paste 2 maintained within this confined pasting zone, which assists in impregnating paste into the fibre material. A pressure transducer for measuring the pressure may be used to monitor this pumping pressure. At the same time the vibrator 3 operates to vibrate the paste in the confined pasting zone, which assists in fluidising the paste in the confined pasting zone. Paste 2 in the confined pasting zone flows into and impregnates the fibre material 4 as it passes through the confined pasting zone beneath the vibrator 3. The paste in the confined pasting zone may be considered as a body of flowing paste under pressure and may also be fluidised by vibration, the pressure being a static pressure sufficient to overcome the flow resistance of the fibres, so that the paste flows into and continuously impregnates the paste through the major surface of the fibre material. The paste impregnates into and through the full depth of the fibre material. The vibrator 3 may operate at ultrasound, or a suitable subsonic or sonic frequency as referred to previously.

Figure 4:
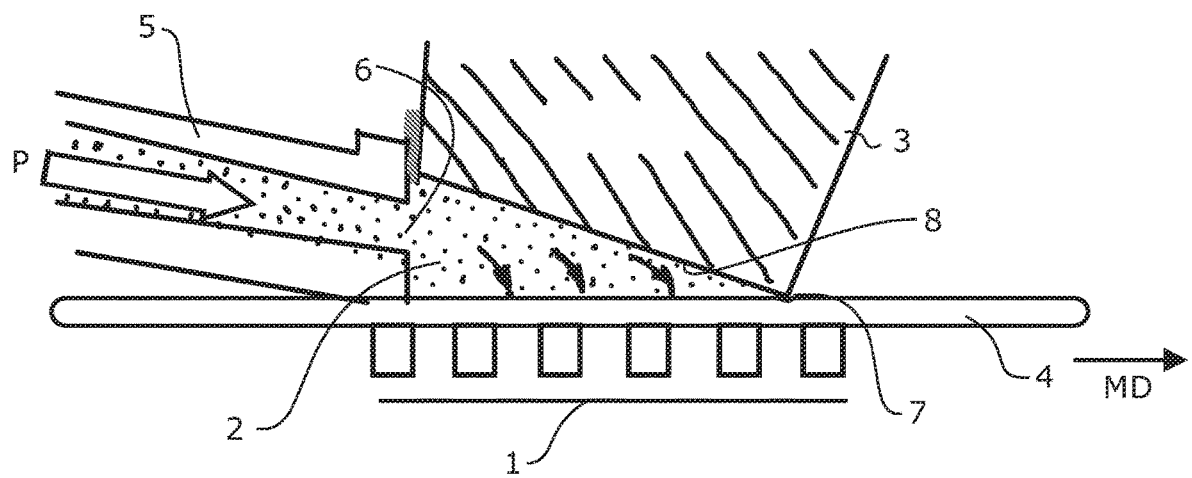

FIG. 4 shows a second embodiment of an electrode paste impregnation stage of the invention similar to the embodiment of FIGS. 1 and 2 except that the surface/plate 1 is a perforated belt or plate, providing a clear path for air to escape from within the fibre material 4 as paste enters the fibre material, in the pasting zone.

Figure 5:
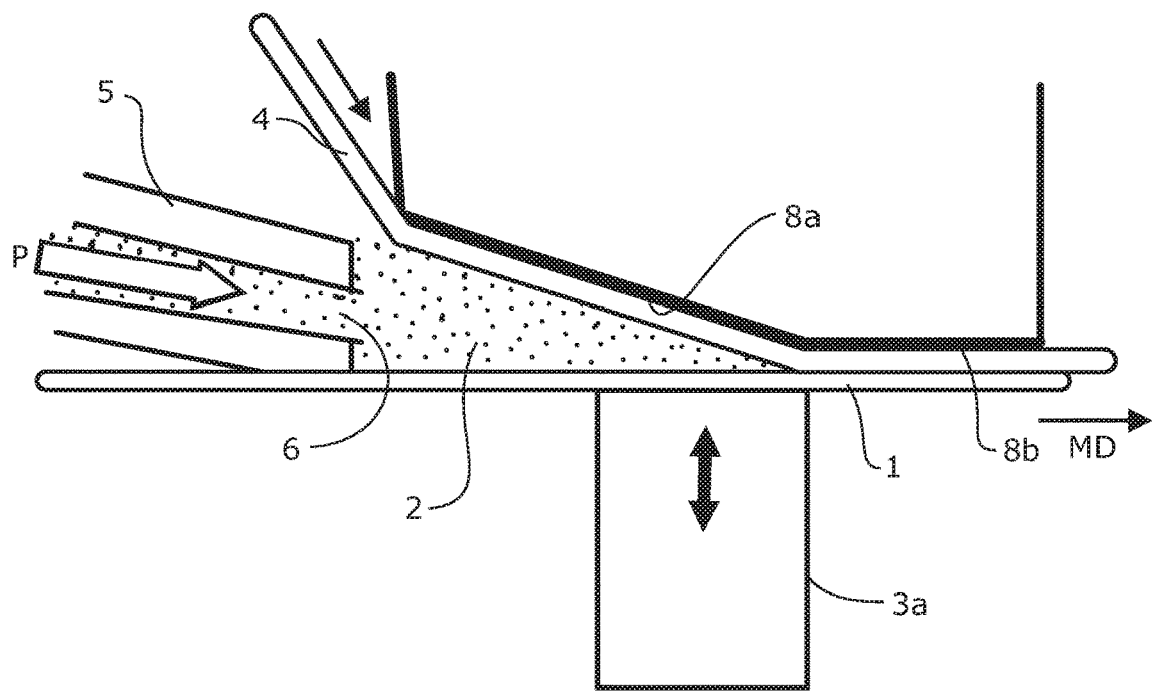

FIG. 5 schematically illustrates a third embodiment of another electrode paste impregnation stage in which the vibrator 3a is positioned below the plate 1. The confined pasting zone is defined by a wall 8a above the plate 1 which extends across the fibre material and angles downwardly towards the plate 1 in the machine direction as shown. The wall continues forward at 8b to define an extended pasting exit from the paste application stage, across the width of the fibre material, which may assist in removing any excess paste from the top surface of the pasted fibre material as it exits the paste application stage. Also in FIG. 5 the fibre material enters the confined pasting zone from above the paste entry orifice 6 as shown, and passes down under and against the wall 8a. Thus the effect of the static pressure maintained within the confined pasting zone and vibration of the paste by vibrator 3, is to cause the paste to flow upwardly, into the fibre material to impregnate the fibre material.

Figure 6:
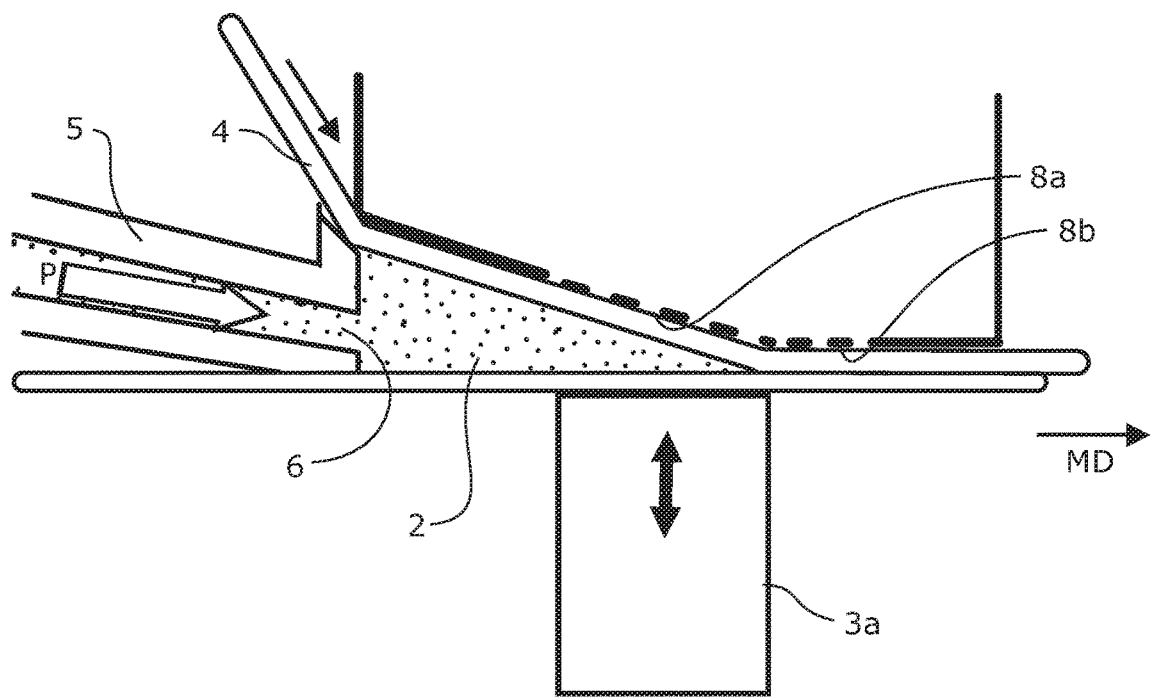

FIG. 6 shows an embodiment similar to FIG. 5 except that the wall 8a and 8b are perforated to provide a clear path for air to escape from within the fibre material as the paste enters the fibre material.

In the embodiments shown the underside wall 8 of the vibrator or wall 8a, are flat walls which descend towards the surface 1 in the machine direction to define the confined pasting zone but in alternative embodiments may be for example in a curved wall such as a convex wall which curves downwardly towards the surface, through the confined pasting zone in the machine direction.

A fibre material feed system with drivers, in the embodiment described in FIG. 1 shows nip rollers 12 on the exit side of the paste machine in the machine direction, that are provided to move for example by drawing the fibre material through the interior of paste application stage under tension. A pair of nip rollers 12 is provided on either side in plan view and the nip rollers contact opposite faces of the fibre material on either side along narrow lengthwise edges of the fibre material.

In operation paste is delivered from a paste supply such as a paste supply hopper or a paste manufacture stage at which paste is continuously mixed/produced and from which it is supplied to the paste application stage.

Preferably while the fibre is drawn past the paste application stage in a machine direction it is held taut in and transverse to the machine direction.

The direction of vibration is preferred to be perpendicular or approximately perpendicular to the plane of the fibre material. Typically the paste behaves as a particular type of shear-thinning fluid known as a Bingham plastic with a yield shear stress necessary to begin shearing movement, and when moving has a constant increase of shear stress per unit increase of shear rate. This constant increase is known as the plastic viscosity. Yield stresses may be in the range 5 to 500 Pa and the plastic viscosity in the range 0.1 to 5 Pa s.

As stated the speed of the material through the paste combined with the vibration as described, causes the paste to impregnate between the material fibres such as into the pores in the material and/or between the fibres, preferably fully through the thickness of the material but at least 50% into the thickness of the material, or 60% or 70%, or 80% or 90% into the thickness of the material. In some embodiments preferably at least about 5 gm/cm$^3$ or at least about 4.5 gm/cm$^3$ or at least about 3.5 gm/cm$^3$ or at least about 3 gm/cm$^3$ or at least about 2.5 gm/cm$^3$ or at least about 2 gm/cm$^3$ or at least about 1.8 gm/cm$^3$ of paste is impregnated into (is contained between outer surfaces of) the material, over at least 70% of the volume of the material.

In some embodiments the contact time between the material and the paste is less than 0.1 second, or at least 0.1 second, or at least about 1 second or at least about 5 seconds or at least about 10 seconds and/or not more than about 30 seconds or not more than about 60 seconds.

A scraper edge or edges, or a roller or rollers, or a blade or blades (such as air blades), or similar, are provided, across the aperture above and/or below the aperture to remove paste from both upper and lower planar surfaces of the fibre material as or after it exits the paste application stage so that the pasted material has a desired predetermined thickness. In some embodiments the thickness of the pasted electrode through the plane is less than 5 mm, less than 3 mm, less than 2.5 mm or less than 2 mm thick. Ideally scraping occurs soon after pasting where the paste is still fluid. In some embodiments an over paste is subsequently provided to the pasted electrode.

The resultant continuous length of pasted fibre material can then be cut into individual electrodes or groups of electrodes.

The machine may enable high volume manufacture of multiple pasted electrodes for Pb-acid batteries.

In the embodiments described above the fibre material 4 is moved by surface 1 relative to the paste application stage at a constant speed in the machine direction during pasting, but in alternative embodiments the machine may operate with a stepped movement, in which at each step a defined length (in the machine direction) of the fibre material is advanced to the confined pasting zone and then paused during pasting, before the machine then steps that segment of material forward exiting the pasting zone and forward a next defined length of the fibre material into the pasting zone, and this is repeated. Also, in the above described embodiments the fibre material 4 is moved by surface 1 relative to the paste application stage but in alternative embodiments the paste application stage may move over stationary segments of the fibre material, from a starting position to a finishing position applying paste during the sweep before the paste applicator returns to the starting position and a next segment of the fibre material is stepped forward.

Figure 7:
Figure 8:
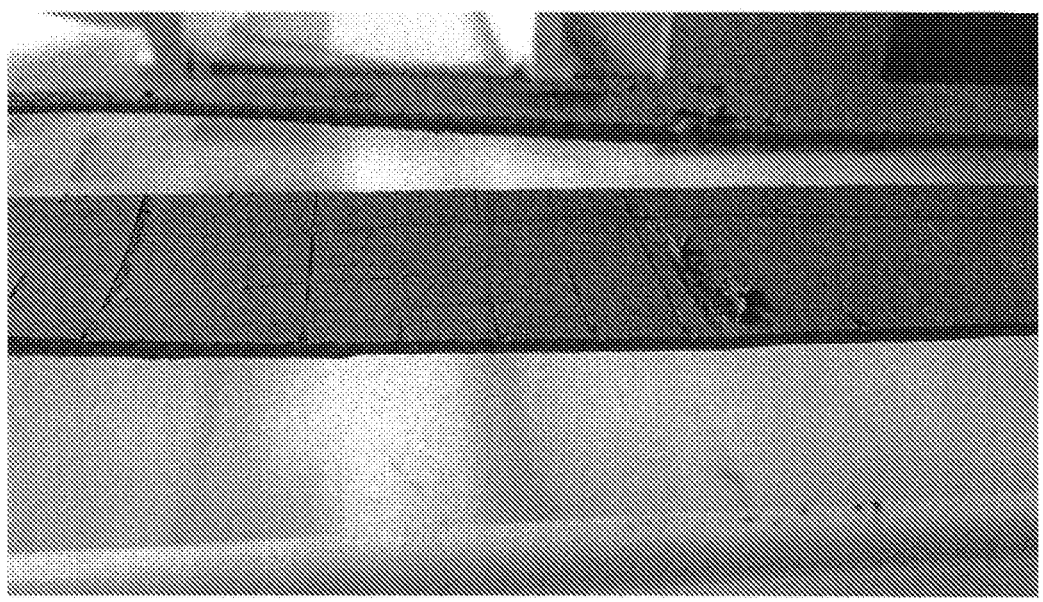
FIG. 8 is an image of a strip of carbon fibre material with a thick paste skin on an external surface thereof.
Figure 8A:
FIG. 8a is an image of a strip of carbon fibre material with a thick paste skin that has been partially removed to expose the carbon fibre, FIG. 8b in an end view of the carbon fibre material as shown in FIG. 8A where the thick paste skin has prevented the paste from penetrating into the interior of the carbon fibre.
Figure 8B:
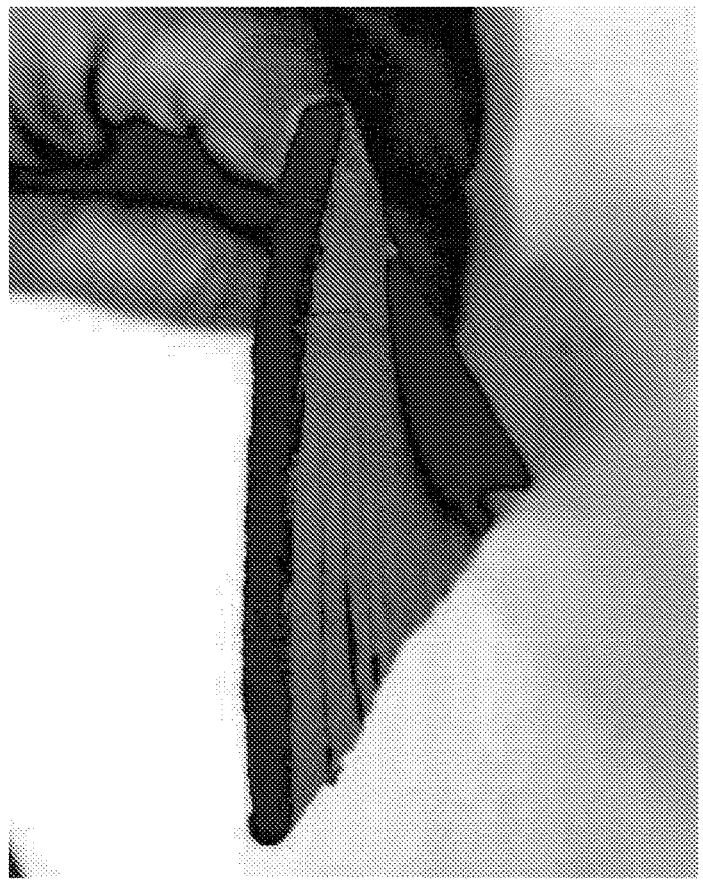

We have found that impregnating paste into fibre materials (whether conductive or non conductive) having an interfibre spacing of about 100 microns or less, or having a solid volume fraction of greater than 2%, continuously (or semi-continuously) at a production speed of about 5 mm/second or more, can be problematic. This is particularly so where the paste has a yield stress of about 50 kPa or higher, which can be exerted on the surfaces of the fibres, and must be overcome to impregnate the paste into the fibre material. The method of the invention may enable pasting of such materials at such a production speed or above. Also at least some embodiments of the invention may at least ameliorate the following additional issues:

- The fibre material may in some cases be a carbon fibre material which is hydrophobic, for example with low surface N and 0 functional groups which contributes to low gassing, but at the same time exhibit greater difficulty in full paste impregnation at production speeds encountered with such hydrophobic carbon fibre materials.
- The fibre material may in other cases be a carbon fibre material which is hydrophilic, which can be difficult to fully impregnate at a production speeds without dewatering of the paste at impregnation (water impregnating but solids remaining on the surface of the fibre material). As stated we have found that the invention may reduce or minimise filtering out of the solid materials in the paste by the fibre material during impregnation of the paste. FIG. 8 is an image of a strip of carbon fibre material with an (undesirable) thick paste skin on an external surface thereof and FIG. 7 comprises two images of cross-sections through strips of carbon fibre material with good paste distribution through the internal voidage of the material, achieved by at least some embodiments of the invention.
- In some cases the paste may have an acid content of about 6% or lower, and we have found batteries comprising the electrodes so pasted may exhibit both low gassing and good DCA but increasing the acid content may increase difficulty in adequately impregnating the paste, particularly into hydrophobic carbon fibre. This can be assisted but only in part, by a higher water content to give the paste a more fluid consistency to facilitate impregnation of the higher acid paste into the fibre material. However such pastes may be more readily impregnated at production speeds by the method of the invention.

Further advantages of at least some embodiments of the invention—confined pasting zone, may be:

Allows pasting at high speed while being gentle in interaction with the fabric.

Very little waste of paste during production.

Good metering of paste leading to high extent of filling the voidage inside the fabric (>99%).

Negligible skin of paste left on the surface of the fabric.

Able to paste with paste densities of between 2.5 to 5.0 g/cm$^3$, resulting in high uniformity of loading of the paste into the fibre material electrodes.

Ensuring that the paste is well connected to the lug material.

In summary the method of the invention may enable optimising of battery performance while also facilitating impregnation of the paste into the fibre material in mass production.

Paste

The paste comprises Pb-based particles. In a preferred form the paste comprises a mixture of particles of Pb and PbO and a fluid. In a preferred form the fluid is water, and may include an acid and/or an alcohol. In some embodiments the acid is dilute sulfuric acid. In some other embodiments the alcohol is ethanol. Alternatively the paste may comprise lead sulphate (PbSO$_4$) particles and a fluid that is selected from water, an acid (preferably dilute sulphuric acid) or an alcohol (preferably ethanol). In some embodiments the paste at impregnation into the electrode comprises water and sulphuric acid comprising between 0% and about 6%, or between 0.25% and about 5.5%, or between 0.5% and about 5%, or between 0.75% and about 4.5% by weight of the paste. The Pb-based particles may comprise milled or chemically formed particles which may have a mean size of 10 microns or less, small enough to fit easily into spaces between the fibres.

The paste may optionally also contain other additives such as carbon black, barium sulphate, and/or an expander such as a lignosulphonate. Barium sulfate acts as a seed crystal for lead sulphate crystallisation, encouraging the lead to lead sulfate reaction. An expander helps prevent agglomeration of sulphate particles at the negative plate, for example avoiding the formation of a solid mass of lead sulfate during discharge. For example an expander may comprise between about 0.05% to about 0.25% or about 0.10% to 0.2% or about 0.10% to 0.15% by weight of the paste at impregnation.

The paste may have a sufficiently low shear strength to flow (slump) when placed in a cylindrical shape on a horizontal surface under gravity. A sufficient slump is seen for a noticeable slumping of a 30 mm high by 30 mm diameter cylinder, at impregnation into the electrode material. Preferably the paste has a creamy consistency. It has been found that this is achieved where the paste at impregnation into the electrode comprises less than about 6% by weight of sulphuric acid.

Electrode Fibre Material

The fibre material may be electrically conductive or non-conductive. The fibre material may be a woven material (comprising intersecting warp and weft fibres), a knitted material, or a non-woven material such as a fluid-entangled material and/or a felt material such as a needle-punched felt material. The material typically has an average interfibre spacing less than about 100 microns or less than about 50 microns. The material may have an amount of cylindrical surface of fibres per unit volume of electrode $10^3$ to $10^6$ m$^2$/m$^3$. The fibre diameter may be in the range from about 1 micron to about 30 microns, from about 4 microns to about 20 micron, from about 5 microns to about 15 microns. The voidage in the unimpregnated fibre material may be at least about 95% for example, to about 96% for example, or to about 97% for example, or to about 98% for example, or to about 99% for example. Typically the fibrous material has length and width dimensions in a major plane of the material and an average thickness perpendicular to said major plane of the material, which may be for example about 0.2 mm or about 1 mm and/or less than 5 mm or less than 3 mm or less than 2 mm. Felt or other non-woven planar electrode material may be produced to very low thickness such as for example 2.5 mm or less. In at least some embodiments the fibrous material comprises filaments of average length in the range of greater than 2 cm.

The fibre material may have a thickness (transverse to a length and width or in plane dimensions of the electrode) many times such as about 10, 20, 50, or 100 times less than the, or any, in plane dimension of the electrode. The thickness may be less than about 5 mm or less than about 3 mm or less than about 2 mm or about or less than about 1 mm or about 0.2 mm for example. Each of the in plane length and width dimensions of the electrode may be greater than about 50 mm or about 100 mm for example. Such electrodes have a planar form with low thickness. In preferred forms the electrode is substantially planar and has a dimension from a metal lug for external connection along at least one edge of the electrode equal to or less than about 1000 mm, or less than about 800 mm, or less than about 600 mm, or less than about 5000 mm, or less than about 200 mm, or less than about 150 mm, or less than about 100 mm or less than about 70 mm, or less than about 50 mm, or about 30 mm or less for example (with or without a macro-scale current collector). Alternatively such a planar form may be formed into a cylindrical electrode for example.

The fibre material may comprise any fibre material that can survive in an acid battery environment, such as a carbon fibre material, and such as a woven or knitted or non-woven or fluid-entangled or felted fabric or needle felted fabric, and for example an Oxidised Polyacrylonitrile (PAN) fibre (OPF) or glass fibre or silicon based fibrous material. The fibres, for example, carbon fibres, are typically multifilamentary for woven fabrics but may be monofilament. Non-woven materials with random fibre entanglement and intersections may be advantageous over woven materials with regular intersections of warp and weft fibres at right angles. Suitable carbon fibre material may comprise or be derived from rayon, polyacrylonitrile, phenol resin, or pitch materials or lignin. The average depth of the bulk material may be at least 0.2 millimetres or at least 1 millimetre. At least a majority of the fibres have a mean fibre diameter of less than about 20 microns, or less than about 10 microns.

The current collector material and the fibres thereof may be flexible, which will assist in accommodating volume changes of the active material attached to the fibre material during battery cycling, and the microscale fibres may also reinforce the active material, both properties assisting to reduce breaking off ("shedding") of active material from the electrode in use.

Continuous Manufacture

Figure 22:
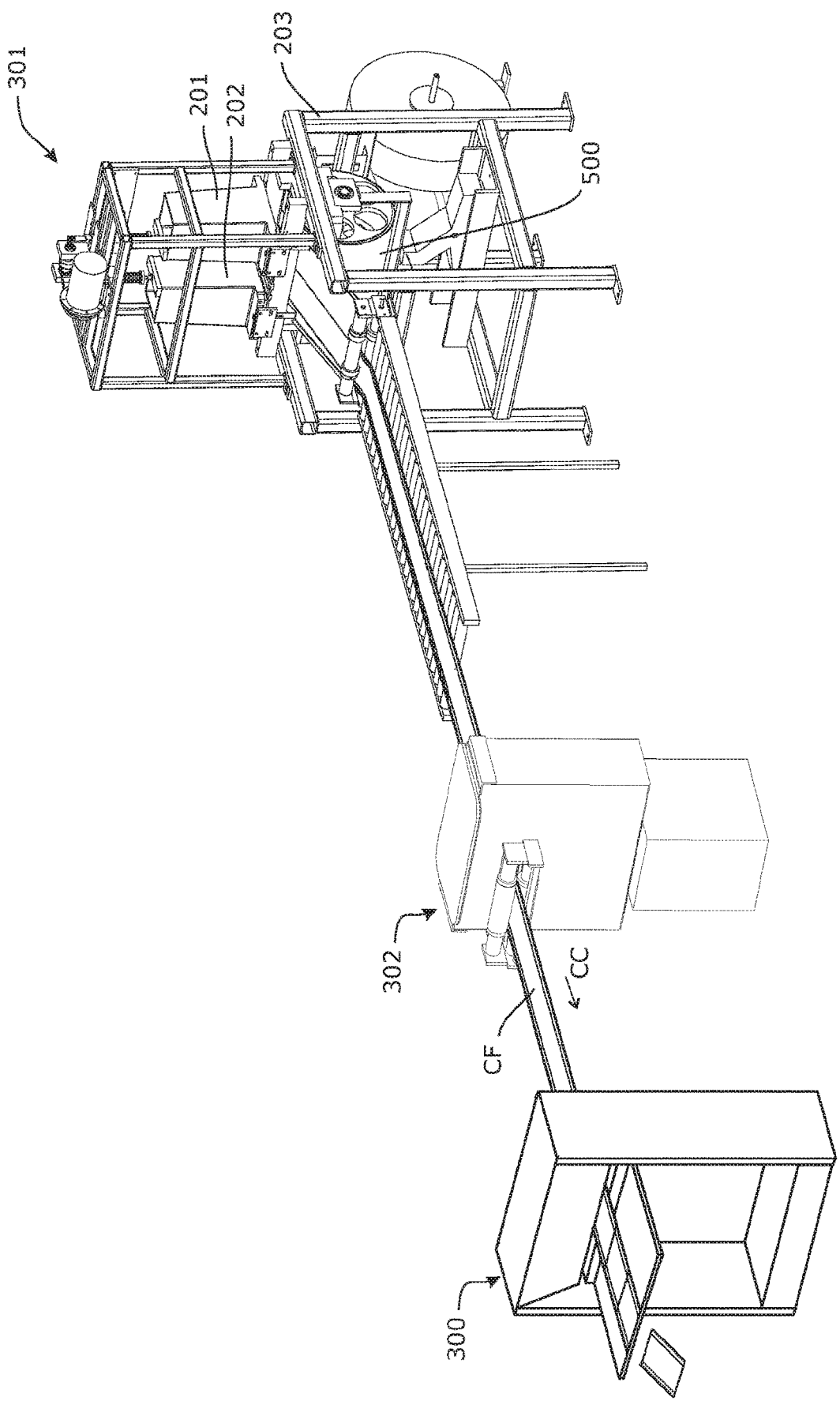
FIG. 22 is a schematic perspective view of a manufacturing line comprising lug forming along one lengthwise edge(s) of a continuous feed of electrode material moving in a machine direction on the manufacturing line, electrode paste impregnation in to the electrode material, and cutting of the pasted electrode material, into multiple individual produced lugged, pasted electrodes.

With reference to FIG. 22, as stated, to enable fast high volume manufacture of multiple electrodes, in a continuous manufacturing process contacting the fibre material with the active paste may be carried out by drawing a continuous length of the fibre material past a paste application stage and subjecting the paste to pressure and vibration within a confinement zone as described, to aid impregnation of the fibre material by the paste, also preceded before pasting, by forming a lug of higher tensile strength in the machine direction than the fibre material, along a length of the fibre material, for example at or near one or both length-wise edges of the fibre material, and preferably with a lug extension or extensions beyond the edge of the fibre material. The lug forming may occur immediately prior to pasting, or alternatively for example, fibre material after having a lug formed thereon may be rolled and stored, or even shipped to a different location, for pasting. Also, after lug forming and pasting, the pasted fibre, after a drying process or similar, can then be cut to form multiple individual electrodes or groups of electrodes each with a lug for external electrical connection of the electrode element.

FIG. 22 is a schematic perspective view of a manufacturing line comprising a lug forming machine 301 that provides a lug along one or both lengthwise edge(s) of a continuous feed of electrode fibre material CF moving in a machine direction on the manufacturing line, to an electrode paste impregnation machine 302 which impregnates paste into the electrode fibrous material, and cutting of the pasted electrode material at cutting machine 300, to produce multiple individual lugged, pasted electrodes. As shown, pasting machine 302 is preceded in the machine direction by a lug forming machine 301. Continuous fibre material, is unwound from a roll 300 of many metres and is moved continuously or at least with a stepped movement, through the lug forming machine 301 which forms at least one lengthwise extending conductive lug in the fibre material, typically at or near a lengthwise edge of the fibre material. In the lug forming machine 301 lug material is continuously pressure impregnated into the fibre material as it passes an injector head or heads. The drivers of the fibre material feed system which draw the continuous fibre material past the paste application machine such as the nip rollers described previously, are arranged to grip the fibre material on either side of two or one lengthwise extending conductive lugs so formed in/to the fibre material, at or near opposite lengthwise edges of the fibre material. The conductive lugs have a width across the machine direction less than half of the width of the fibre material and typically only 10% or less, and may have a higher tensile strength in a length or machine direction than the fibre material itself. The lug material is typically a metal such as Pb or a Pb alloy. Use of the continuous lengthwise lug or lugs formed on the fibre material to grip and draw the lugged material past the subsequent paste application stage without tearing or breaking the material facilitates a process of continuous manufacture (with minimised downtime which would otherwise occur at each break). After the lugged material exits the lug forming machine it may pass a trimming stage such as for example a rotary die cutter, a laser cutter or rotating knives on either or both side(s) of the material flow at the exit of the lug forming machine, which trim(s) the outer edge of the lug (outer edge at which the continuous lug is formed). The fibrous material may then go through the pasting machine and after the pasting machine, the cutting machine 303 such as a laser cutter, guillotine or saw machine, is arranged to cut the pasted fibre material into multiple smaller lengths of pasted fibre material to form multiple individual electrodes or groups of electrodes each with a lug for external electrical connection of the electrode element. Between the pasting machine and cutting machine 303 a cleaning stage may be provided to remove paste from the lug on the fibre material. Additionally a dryer, preferably a flash dryer, may further be provided after the pasting and before or after the cutting stages to dry at least the exterior surfaces of the pasted material to a "touch dry" state before the pasted fibre is continued on in the process. A common controller controls and synchronises operation of all machines/stages on the manufacturing line.

Figure 9:
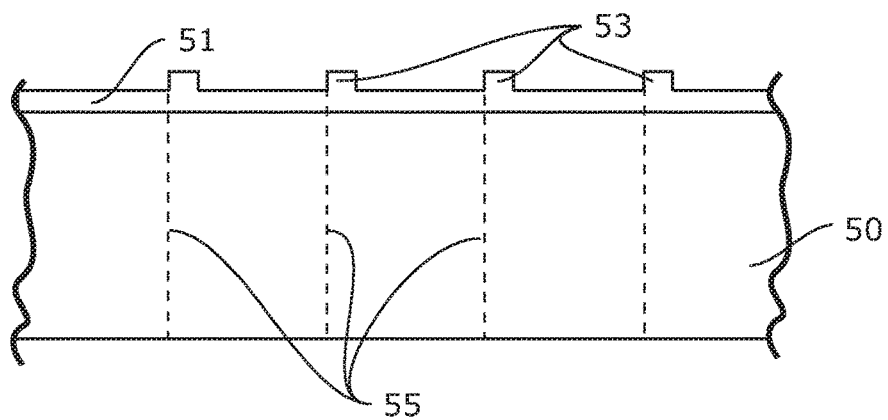
FIG. 9 is a schematic plan view of a length of electrode material with a Pb lug formed thereon along one lengthwise edge.
Figure 10:
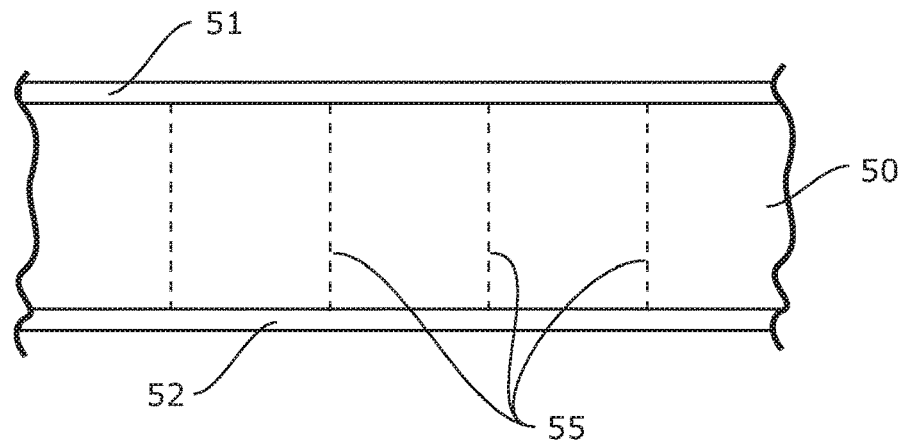
FIG. 10 is a schematic plan view of a length of electrode material electrode with a Pb lug formed thereon along two lengthwise edges.
Figure 11:
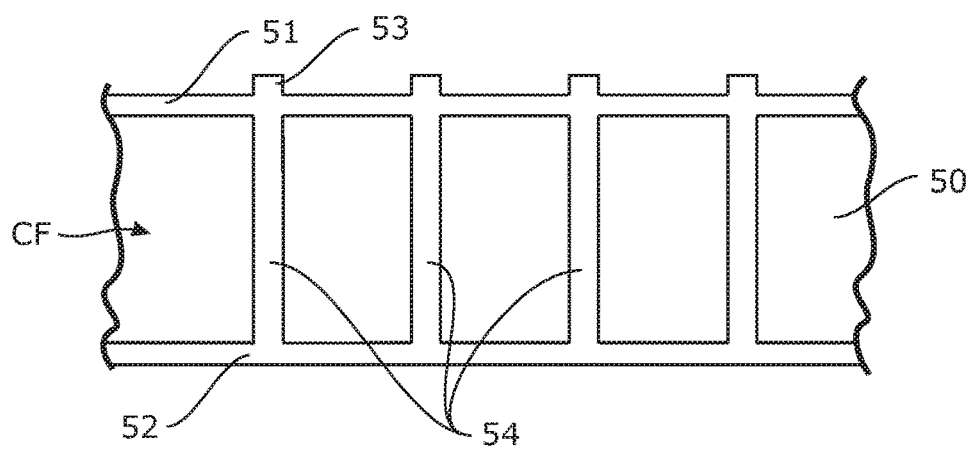
FIG. 11 is a schematic plan view of a length of electrode material with a Pb lug formed thereon along two lengthwise edges and transversely across the length of the electrode material at intervals, FIG. 12 schematically shows a portion of electrode material with a Pb lug strip being formed on it in close up.

FIG. 9 is a schematic plan view of a length of electrode material 50 with a Pb lug 51 formed thereon along one lengthwise edge, and FIG. 10 is a schematic plan view of a length of electrode material 50 with a Pb lug 51 formed thereon along one lengthwise edge and a similar lug 52 formed along the opposite lengthwise edge. In FIG. 11 macro or transverse current collector strips 54, preferably also made with Pb, are also formed at intervals connecting Pb lugs 51 and 52. In the embodiments of FIGS. 9 and 11 lug extensions 53 extend beyond the edge of the fibre material 50 and are formed at the same time as the Pb lugs. In other embodiments instead of the lug extensions being formed, these are cut out by a separate machine that for example stamps the lug extensions from the continuous strip of lead formed.

Referring to FIGS. 9 and 10, broken lines across the fibre material 50 indicate by way of example where a cutting machine may cut the continuous fibre (and through the lugs 51, or 51 and 52), to produce individual pasted electrodes or groups of electrodes.

Optionally the fibre electrode material may be increased in tensile strength, to better withstand being drawn through the manufacturing line as described above, by arc treatment and/or by incorporating higher tensile strength threads in the material through and along or near one or both edges of the fibre material. Such threads can be either acid resistant or may dissolve in the acid environment of the battery.

Lug Forming Machine

The lug forming machine may be arranged to form the lug(s) by pressure impregnation of the lug material into the fibre material as the fibre material moves relative to a pressure injection stage. The fibre material may move relative to the pressure injection stage on a heat sink conveyor. In at least some embodiments the lug forming machine is arranged to pressure impregnate the electrically conductive lug material into a lug zone part of the fibre material by a series of pressure injection pulses during the relative movement between the fibre material and the pressure injection stage, so that multiple pressure injection pulses inject lug material into different adjacent portions of the fibre material but forming the continuous lug strip along the lug zone.

Figure 23:
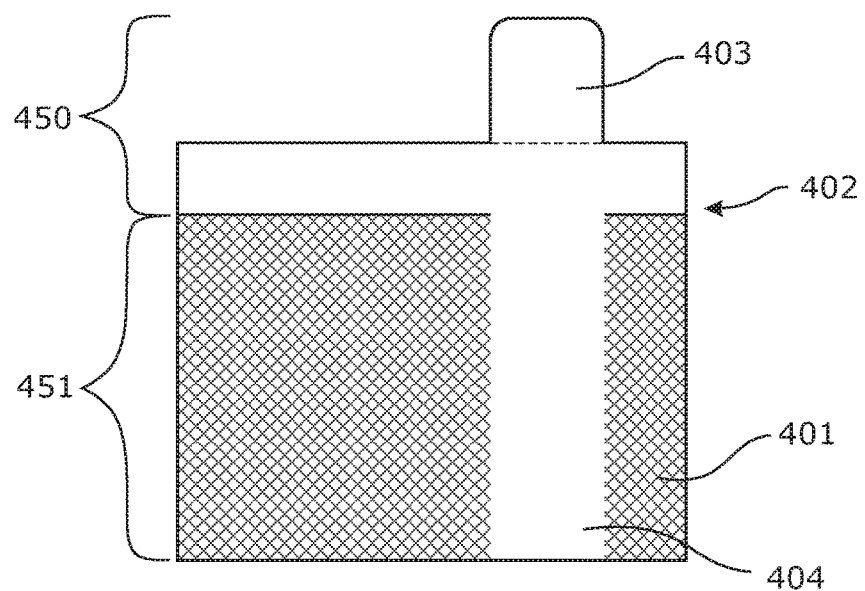
FIG. 23 is a side view of an exemplary embodiment of a lugged electrode.
Figure 24:
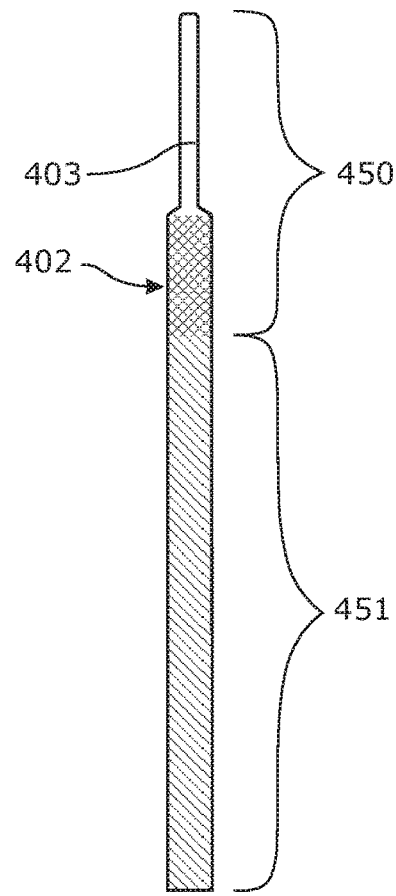
FIG. 24 is a schematic cross-section view of the lugged electrode of FIG. 23, FIG. 25 schematically shows another embodiment of an electrode paste impregnation stage (different to that of FIGS. 1-6) which may be used in the manufacturing line of FIG. 22 (alternative to that of FIGS. 1-6)

FIG. 23 is a plan view of an exemplary embodiment of a finished electrode of for example carbon fibre, with one form of lug. The fibre material is indicated at 401 and the lug at 402. The lug has a similar thickness (dimension through the plane of the material) to the fibre material thickness (single or multiple layers) or a lesser thickness. FIG. 24 is a schematic cross-section view of the lugged electrode of FIG. 23, indicating both a lug zone 450 and electrode zone 451 which is pasted. The lug has a lug extension 403 beyond the edge of the fibre material, comprising lug material only ie solid lug material such as Pb. The lug extends along a single edge of the electrode, but alternatively the lug may extend along two or more edges of the electrode. The lug may increase the overall tensile strength of the fibre material along the length of the fibre material. Additionally a macro-scale/transverse current collector 92 may be provided that is formed in the same way as the lug that extends from the lug zone across and to any location within the electrode zone 451. Preferably the macro scale/transverse current collector extends to the edge of the electrode diametrically opposite the lug zone. In some embodiments these macroscale/transverse current collectors may act to further aid in providing additional tensile strength across the width of the fibre as it moves through the paster in the machine direction. In further embodiments the combination of the lug and macroscale/transverse current collectors may allow the tensile strength of the fibre material to be at about 20 kN/m$^2$ or about 25 kN/m$^2$, or about 30 kN/m$^2$, or about 40 kN/m$^2$ or about 50 kN/m$^2$ or about 60 kN/m$^2$.

In some embodiments the impregnating lug material impregnates between at least about 50%, at least about 70%, at least about 80%, or at least about 95% of the fibres in the desired lug areas. In some embodiments the interfibre voidage in the fibre material (being the fraction of the total volume defined by the material outside dimensions not occupied by the fibres—in the unimpregnated material) is reduced by impregnation of the lug material into the interfibre voidage between the fibres, at least about 50%, at least about 70%, at least about 80%, at least about 95%, at least about 98%, or at least about 99%.

A preferred embodiment of a lug forming machine is now described with reference to FIGS. 12 to 19. The machine comprises side by side pressure injectors 201 and 202 to form a continuous lug along opposite lengthwise edges of the continuous fibre material as it passes through the machine, and are mounted above a conveyor in the form of rotating drum 500, all carried by frame 203. The rotating conveyor 500 has a width across an axis of rotation equal to or greater than the width across the machine direction of the fibre material so that the drum supports the full width of the fibre material.

Figure 17:
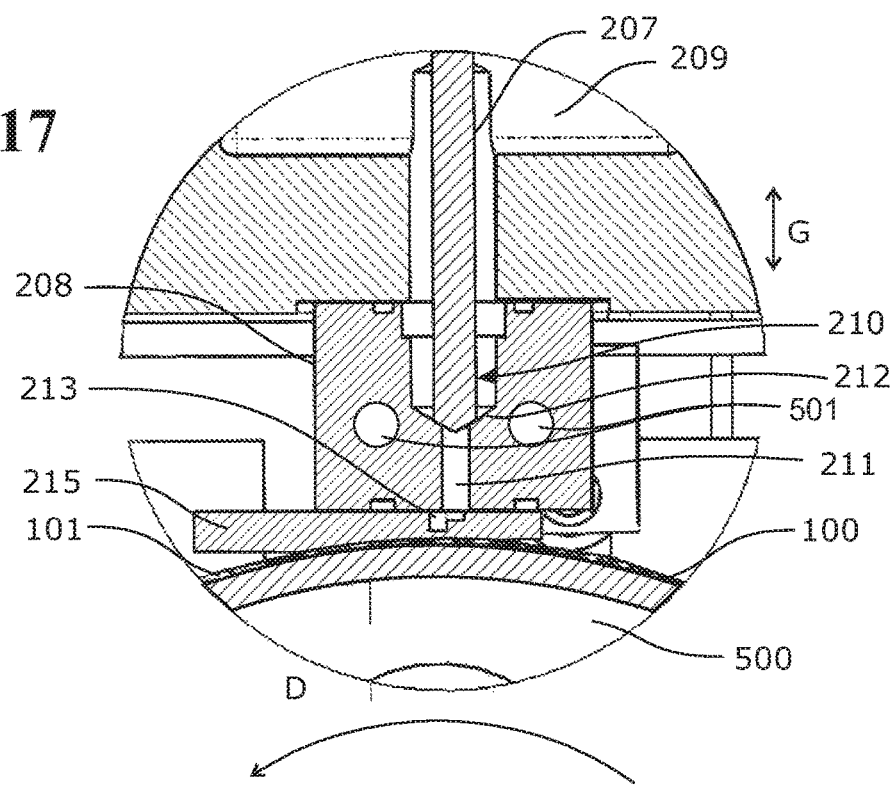
FIG. 17 is an enlarged schematic vertical cross-section view along line II-II of FIG. 14, enlarged to show operating parts in greater scale.
Figure 18:
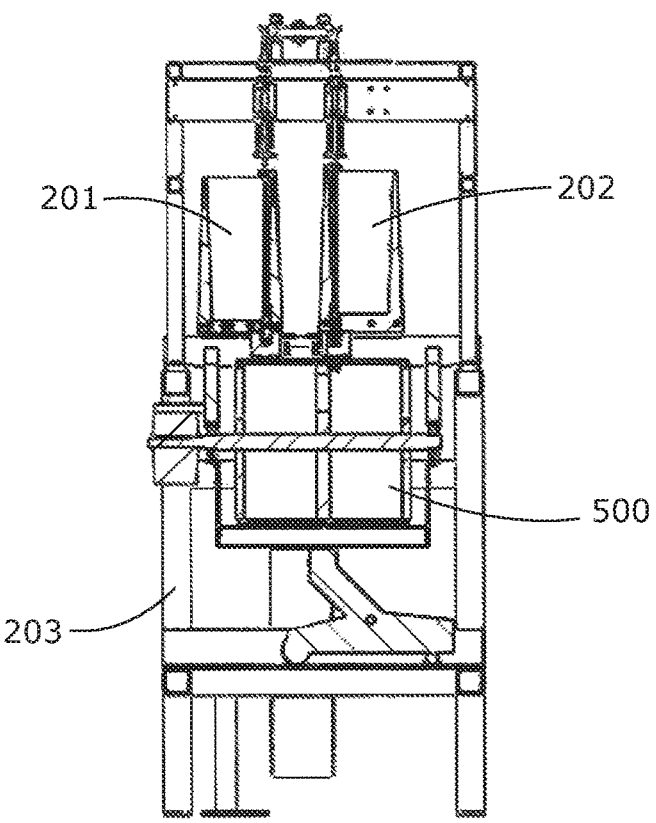
FIG. 18 is a side view of the lug forming machine along line of FIG. 14.

In operation the fibre material passes through a gap between the rotating drum 500 and the pressure injection heads 201 and 202, as pressure injection pulses from the injector heads 201 and 202 impregnate electrically conductive lug material, molten Pb for example, into the fibre material along either edge to form a continuous lug along each edge. FIG. 17 is an enlarged schematic vertical cross-section view along line II-II of FIG. 13 and shows in close up a portion of fibre material 100 with a lug strip 101 being formed on it. The fibre material 100 moves during impregnation in the direction of arrow D beneath the injector head and is supported by the rotating drum which also acts as a heat sink conveyor to rapidly cool the molten Pb as it exits the gap.

Figure 12:
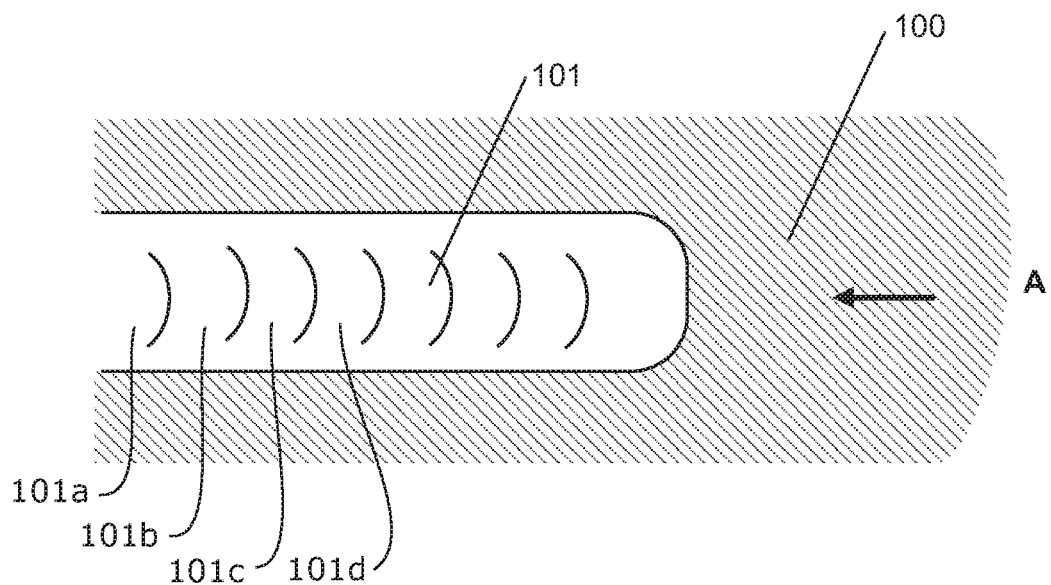
Figure 13:
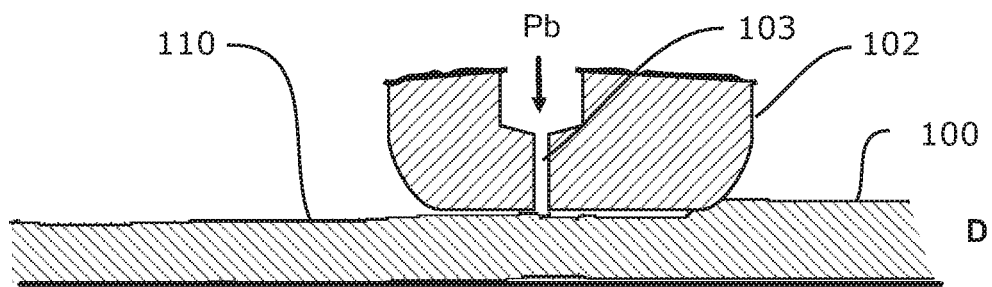
FIG. 13 is a schematic cross-section view of electrode material passing beneath a pressure injection head of a lug forming machine.
Figure 14:
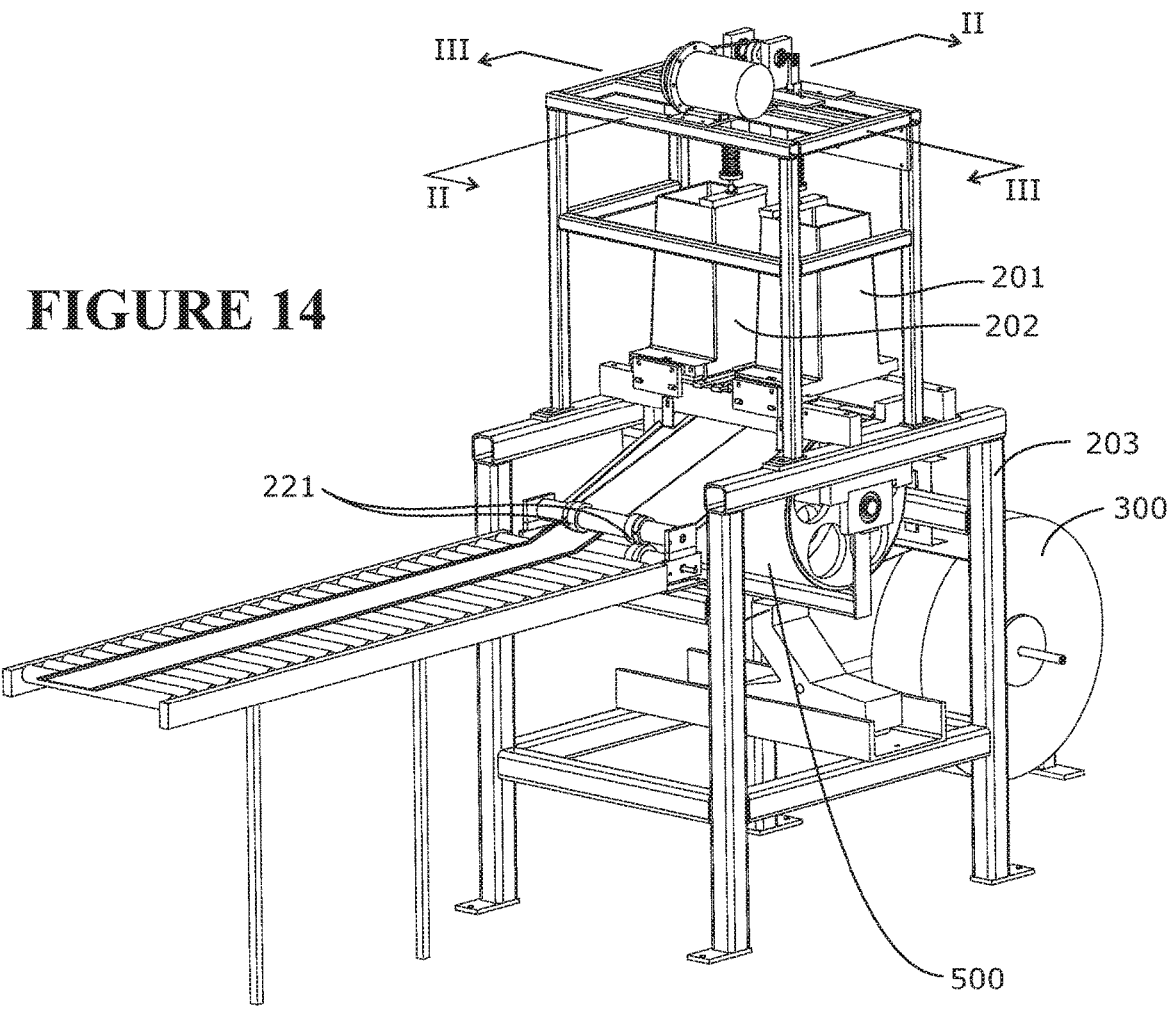
FIG. 14 is a perspective view of an embodiment of a lug forming machine.
Figure 15:
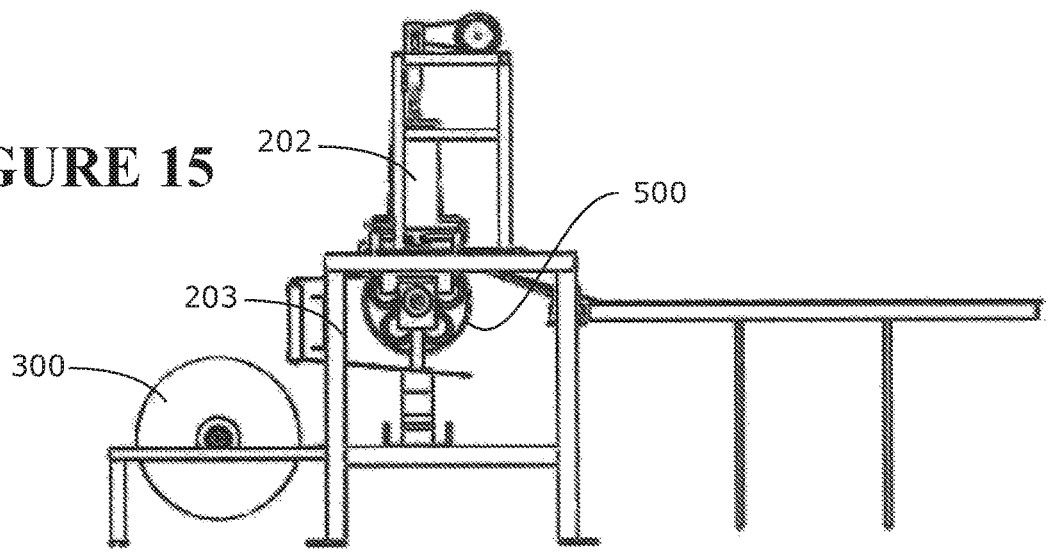
FIG. 15 is a side view of the lug forming machine of FIG. 14.
Figure 16:
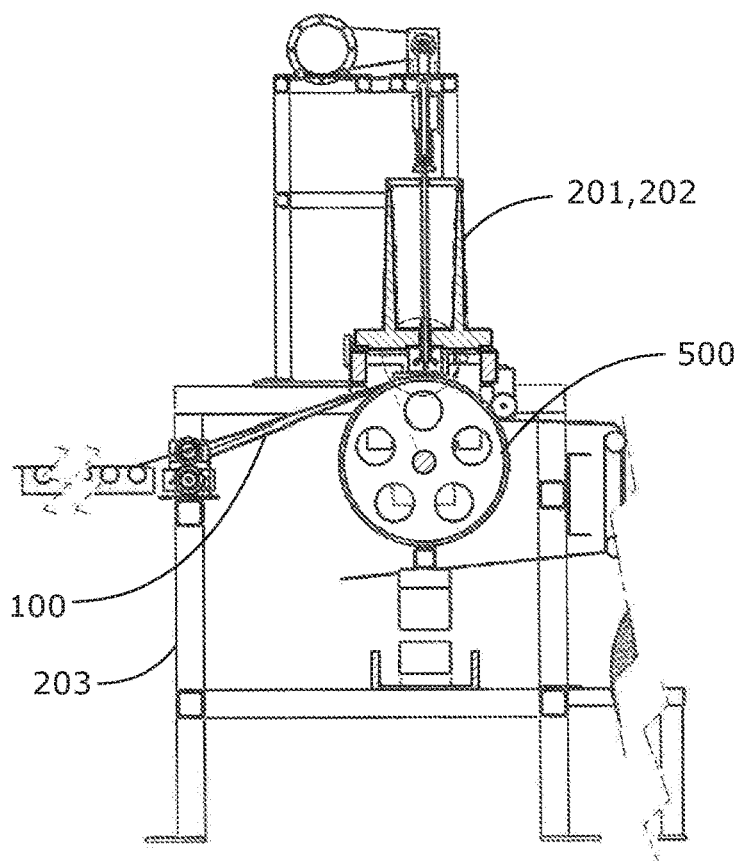
FIG. 16 is a schematic vertical cross-section view of the lug forming machine along line II-II of FIG. 14.

FIG. 13 is a schematic cross-section view of fibre material 100 passing beneath a pressure injection head 102 having an outlet orifice 103. Each orifice 103 may for example have an area to deliver less than or equal to 1 cm3 of molten material per injection pulse. The injector head 102 may contact the surface of the fibre material 100 moving past it or preferably slightly compress the fibre material as shown, for example by about 10-20% of its free depth. The fibre material moves in machine direction D. Referring also to FIG. 12, at each pressure injection a pulse shot of molten Pb is impregnated through the fibre material from the top surface to the bottom surface. The molten Pb surrounds the fibres to form a matrix with the fibres. Compression of the fibre material by the injector head may assist in limiting excessive spread of molten Pb across the top surface of the fibre material and instead assists the molten lead entering into the fibre material. In FIG. 12, 101a indicates the latest shot of molten lug material 102b, 102c, and 102d, indicate past shots, which have rapidly cooled and solidified, as they have moved forward from beneath the injector head 102, so that a continuous lug strip is formed lengthwise in the fibre material 100. A continuous lug strip 101 is formed lengthwise on the fibre material, also with spaced lug extensions 53 beyond the edge of the fibre material. In other embodiments the lug extensions can be cut out for example stamped out of the continuous lug strip. Alternatively pressure impregnation may be carried out using continuous (non-pulsed) pressure injection of the molten lug material as the fibre moves past the pressure injection head.

The speed at which the fibre material moves beneath the injector head, the volume of molten lug material injected at each injector pulse, the duration and frequency of the injector pulses, the duration between injector pulses, the temperatures of the fibre material, and of the molten lug material, are co-ordinated so that the molten lug material impregnating into the fibre material from each new injector pulse merges while molten with the lug material in the fibre material injected at the prior injector pulse, to form the continuous lug strip 101. This is controlled to ensure that lug material does not spread excessively over the upper or lower surfaces of the fibre material, or beyond the desired path within the fibre material. In FIG. 12 the circles 102a-d along the length of lug strip 101 each schematically indicate lug material injected by sequential injector pulses. For example the duration of each pressure injection pulse may be in the range about 0.1 to about 50 milliseconds, or about 0.1 to about 30 milliseconds, or about 0.1 to about 10 milliseconds, and for example injector pulses may be separated by an interval of about 0.1 to about 50 milliseconds, or about 0.1 to about 30 milliseconds, or about 0.1 to about 10 milliseconds, and when the rate of relative movement between the fibre material and pressure injection stage is in the range about 0.01 m/s to 5 m/s. As the injected lug material is injected it cools largely by conduction to the heat sink conveyor, and also as it moves away from the injector head in the machine direction it cools and solidifies. Thus the continuous solid lug strip 101 impregnated into the fibre material is formed along the length of the fibre material. The continuous lug strip may for example have a width in the range about 2 to about 150 mm. The lug strip may be formed along or near one or both opposite long (in the machine direction) edges of the fibre material and/or centrally in the fibre material, and the length of fibre material cut not only transversely into individual electrode segments but also lengthwise. The macro-scale current collector if also provided may for example have a width in the range about 2 to about 150 mm.

Figure 19:
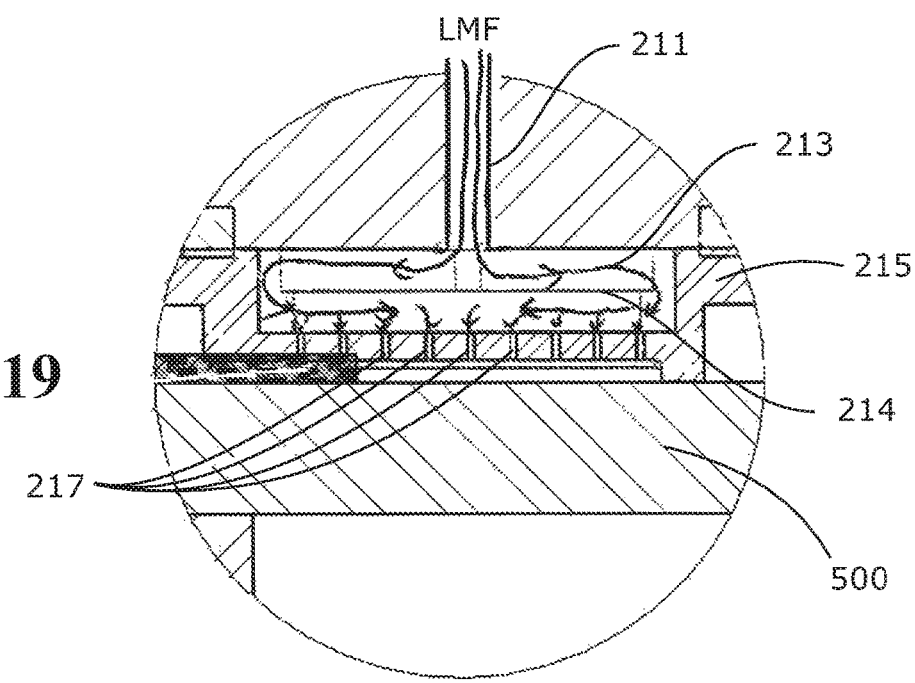
FIG. 19 is a schematic vertical cross-section view along line of FIG. 14, enlarged to show operating parts in greater scale.

Additionally FIG. 17 shows operating parts of injector 201/202 in greater scale. Injector piston 207 moves reciprocally in cylinder 210 in piston block 208 as indicated by arrow G and at each downward stroke pushes molten lug material from heated reservoir 209 which fills cylinder 210, through port 211 until piston 207 seats against valve seat 212 which then closes port 211. The lower surface of foot 215 is curved with a radius to match the drum 201 so that the fibre material is held in a nip between the foot 215 and drum 500 and may be compressed slightly, such as for example to about 80% of free thickness of the fibre material, between the two as described. Heaters 501 may be provided in the block 208 to ensure that the block is maintained at a temperature that does not partially cool or freeze the molten material in the cylinder or port. Referring also to FIG. 19, molten lug material exits from port 211 into chamber 213 provided in foot 215. The molten lug material flows around plate 214 provided to ensure even distribution of the molten flow to all injector outlet orifices 217, and from outlet orifices 217 into part of the fibre material and into the void adjacent the fibre material to form both a composite zone of lead and fibre and a solid lead zone, that together form a lug zone. The flow of the lug material is indicated by arrows LMF. As the piston moves upwardly before the next downward stroke molten Pb refills the cylinder 210 from reservoir 207, before the piston moves downward at the next injection pulse. Molten Pb exiting the orifices 217 impregnates the fibre material and adjacent void passing beneath the injector 202, as described above, and rapidly cools to form the continuous lug as the material exits the space between the drum 201 and the injector.

One piston stroke injecting a set volume of lug metal into the fibre material may comprise one 'pulse' of the injector. The injector system may be arranged to increase the injection pressure so that the injection pressure of the metal into the fibre is higher at or towards an end of the pulse than at or towards a start of each pulse. For the simple single valve mechanical system shown, the closing of the valve takes an appreciable fraction of the cycle time, and the molten metal leaks back through the valve at a reducing rate until it is shut. Thus the available pressure in the space above the injector orifice due to the piston movement gradually increases to a maximum as the valve closes.

The lug forming machine may comprise a fibre material feed system which draws the fibre material through the lug forming machine, which comprises drivers specifically optional nip rollers 221 past the exit side of the rotating drum in the machine direction which contact opposite faces of the continuous lengthwise lug just formed on the fibre material on either side.

Figure 20:
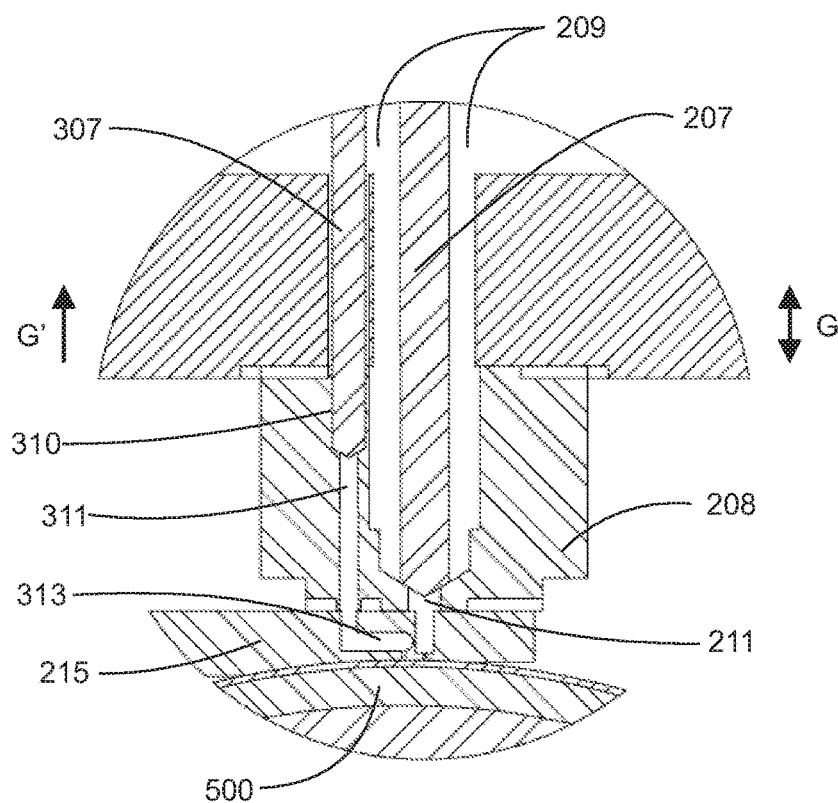
FIG. 20 is an enlarged schematic vertical cross-section view similar to that of FIG. 17 but of an alternative embodiment of an injector head.
Figure 21:
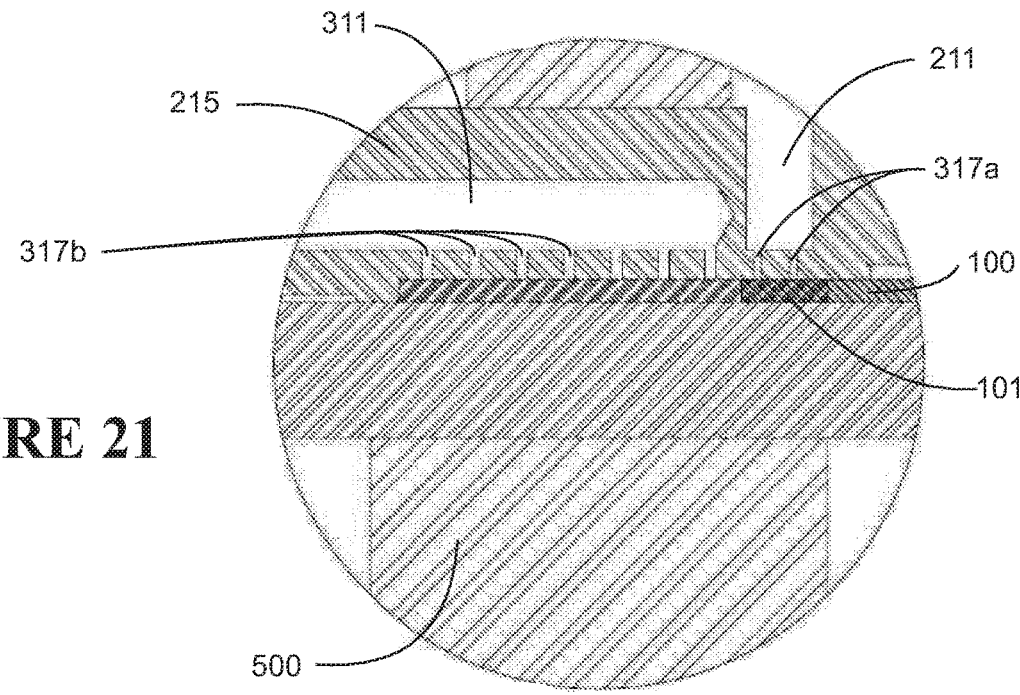
FIG. 21 is an enlarged schematic vertical cross-section view similar to that of FIG. 19 but further enlarged, of the alternative embodiment injector head of FIG. 20 of injector 201/202.

FIG. 20 is similar to FIG. 17 and FIG. 21 is similar to FIG. 19 but further enlarged, and FIGS. 20 and 21 show the operating parts of an alternative embodiment of injector 201/202. Unless indicated otherwise the same reference numerals in FIGS. 20 and 21 indicate the same parts as in FIGS. 17 and 19, which operate in the same way. A difference is that whereas in the embodiment of FIGS. 17 and 19 a single injector piston 207 moving reciprocally in cylinder 210 at each downward stroke pushes molten lug material through injector head 215 to form both a composite zone 101 of lead and fibre and a solid lead zone, in the dual flow embodiment of FIGS. 20 and 21 the piston 207 pushes (relatively higher pressure) pulses of molten lug material through injector head 215 to form the composite zone of lead and fibre and a valve 307 simultaneously meters a continuous flow of lower pressure molten lug material through injector head 215 to form the solid lead zone. The valve 307 moves in chamber 310, in the same piston block 208, and opens in the direction of arrow G' to allow a lower pressure flow of molten lug material from heated reservoir same 209, through port 311 into chamber 313 provided in the injector head 215 and then from outlet orifices 317b into the void adjacent the fibre material 100 to form a solid lead zone, at the same time that molten lug material driven by reciprocating piston 207 through port 211 flows from outlet orifices 317a into part of the fibre material to form an adjacent composite zone of lead and fibre (instead of through orifices 217 in the embodiment of FIGS. 16 and 18). Molten material exiting the orifices 317a impregnates the fibre material and molten material exiting the orifices 317b fills the adjacent void, and the molten material rapidly cools as the material exits the space between the drum 500 and the injector head, to form the continuous lug and lug extension along the edge of the fibre material. Where the molten material is lead it may be advantageous to reduce possible blocking of the injector orifices that the lead comprises a minor proportion of Sn, so that the molten material comprises a Pb—Sn alloy. The low and high pressure flows are synchronized with the travel speed of the fibre material to simultaneously deliver the correct volumes of lead into the edge region 101 of the fibre material and the adjacent void to form the solid lug extension. This embodiment comprises a first pressure injector arranged to impregnate the lug material into a lug zone part of the fibre material and a second adjacent pressure injector arranged to deliver the lug material into an adjacent void to form the solid lug extension adjacent the lug zone part of the fibre material. The lug forming machine may comprise a fibre material feed system which draws the fibre material through the lug forming machine, which comprises drivers specifically optional nip rollers 221 past the exit side of the rotating drum in the machine direction which contact opposite faces of the continuous lengthwise lug just formed on the fibre material on either side.

In yet alternative embodiments arranged to form a lug along the edge of the fibre material and also a solid lug extension continuously along or at spaced intervals along the edge of the lug, after the edge of the fibre material has been impregnated as described above, separately formed lug extension(s) may be attached to the lug by for example ultrasonic welding or soldering together.

Figure 25:
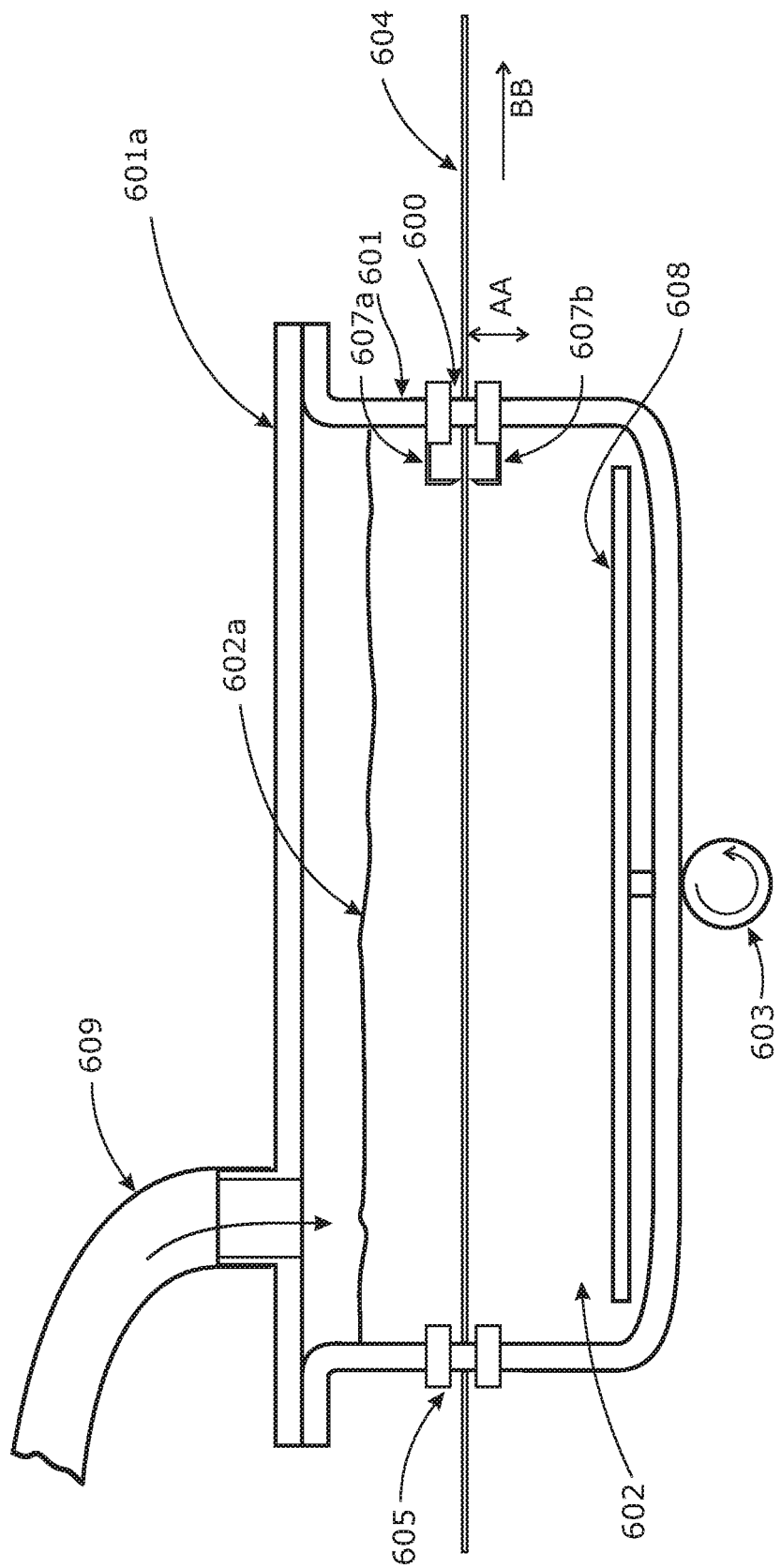
Figure 26:
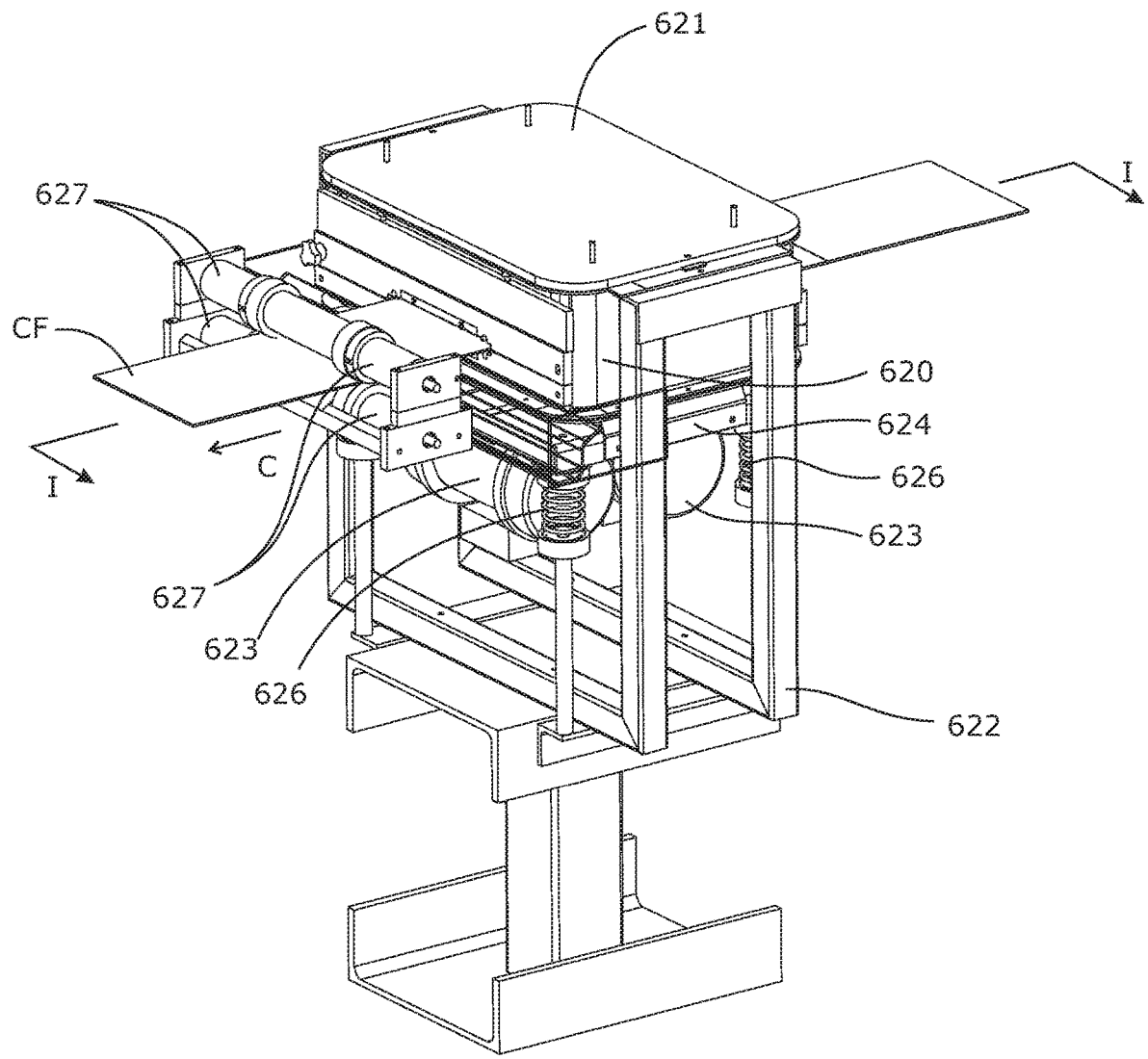
FIG. 26 is a perspective view of an embodiment of an electrode paste impregnation machine according to FIG. 26.
Figure 27:
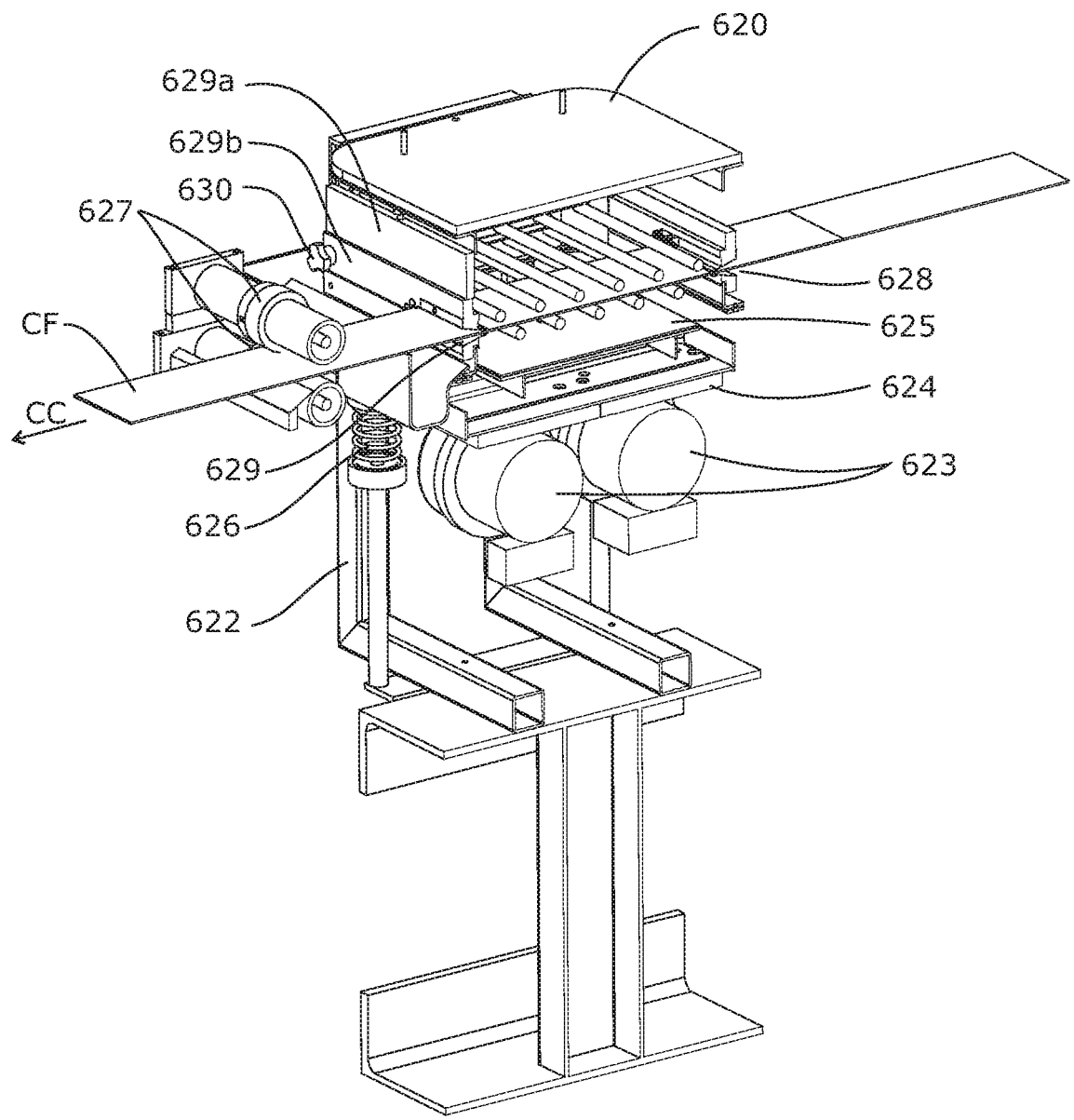
FIG. 27 is a vertical cross-section perspective view of the electrode paste impregnation machine of FIG. 25, along line I-I of FIG. 27.
Figure 28:
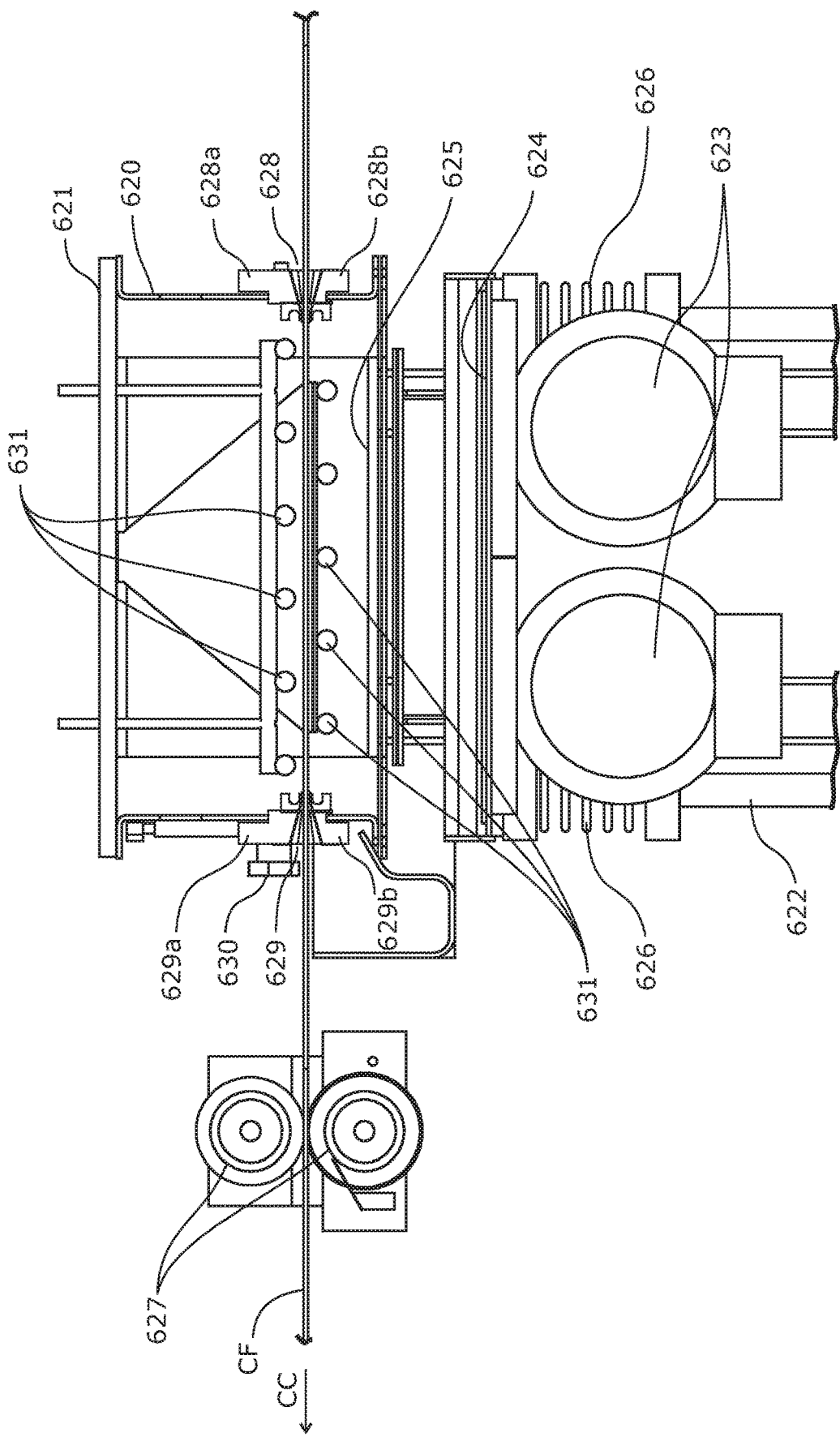
FIG. 28 is a vertical cross-section view, along line I-I of FIG. 27, but of an upper part of the machine and enlarged to show parts in greater scale.
Figure 29:
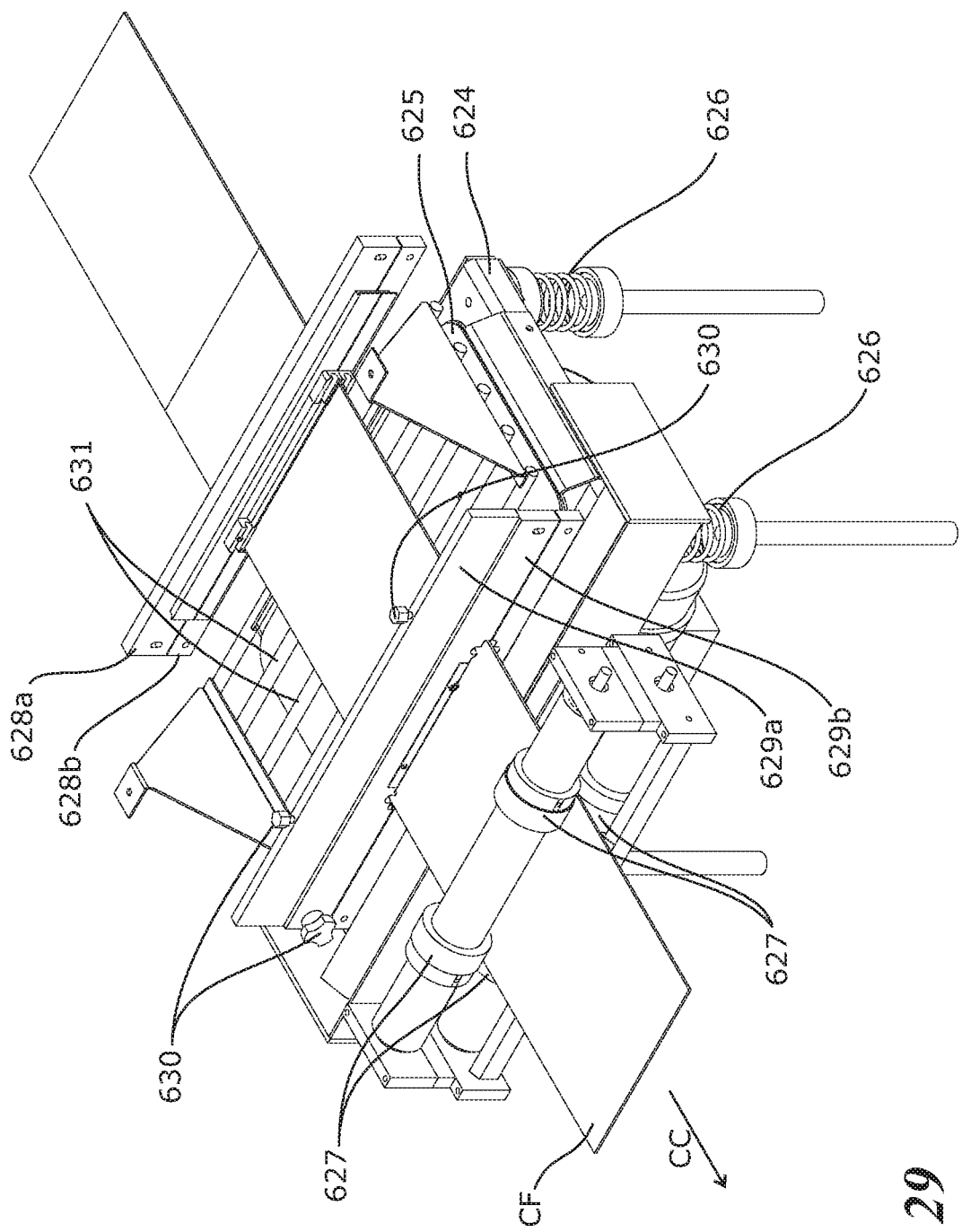
FIG. 29 is an enlarged perspective view of the upper part of the machine similar to FIG. 29 but with outer parts of the machine removed.
Figure 30:
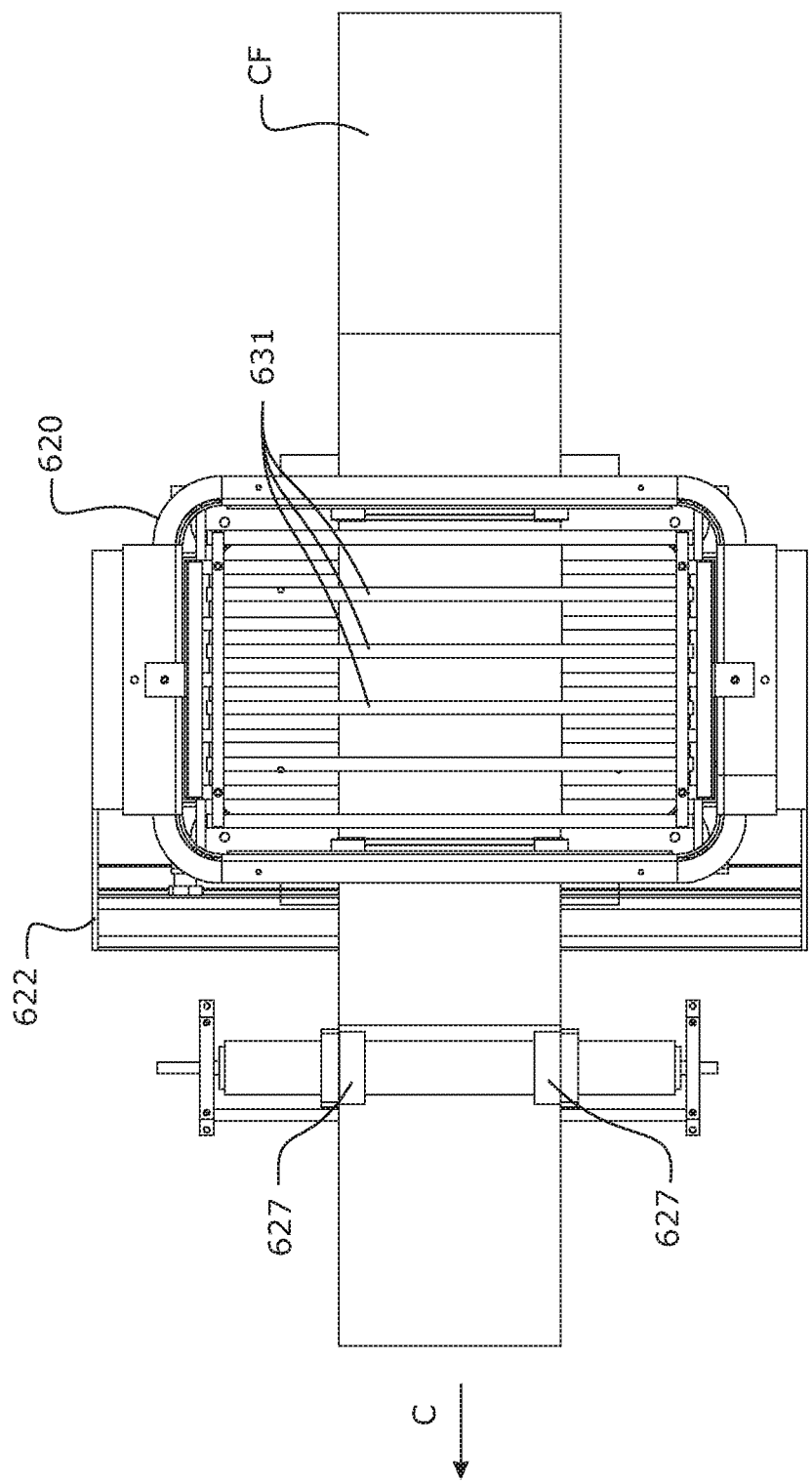
FIG. 30 is a plane view of the electrode paste impregnation machine of FIGS. 26 to 29.

Alternative Electrode Paste Impregnation Stage FIG. 25 schematically shows another embodiment of an electrode paste impregnation stage to that of FIGS. 1-6. FIGS. 26 to 30 show an embodiment of an electrode paste impregnation machine according to FIG. 225. Referring to FIG. 25, tank or bath 601 contains paste 602. Reference numeral 603 schematically indicates a vibration device such as a mechanical vibrator, coupled directly or indirectly to the tank 1, which causes the tank and paste therein to vibrate in operation in a substantially vertical axis as indicated by arrow AA, while a continuous length of a fibre material 604 moves through the tank as indicated by arrow BB. In the embodiment shown the bottom wall 608 of the tank is flexibly resiliently mounted for example by a (square) ring of a flexible resilient material around its periphery, to the surrounding walls of the tank, so that it is free to vibrate relative to the balance of the tank so that vibration imparted to the bottom 608 of the tank is transferred to the mass of paste in the tank. The fibre material 604 is drawn through the tank under tension. For example one or more sets of nip rollers (not shown) outside the tank 601 may pull the material through the tank in direction B. The vibration applied preferably causes the paste to spatter creating eruptions from the surface 602a of the paste to enable full penetration of the paste into the fibre material, rather than the preferential uptake of water by the fibre material if there is no spatter occurring. The tank is schematically shown as an open bath 601 closed in operation by lid 601a, with feed or entry and exit apertures such as transverse slots 605 and 606 through which the unpasted material enters the tank and the pasted material exits the tank. Paste is continuously supplied to the tank at 609. In preferred embodiments the feed and exit slots are provided to allow the fibre material to enter and exit in a horizontal direction or approximately horizontal direction, and comprise seals to prevent paste leakage. The direction of vibration is preferred to be perpendicular or approximately perpendicular to the plane of the fibre material. Typically the paste behaves as a particular type of shear-thinning fluid known as a Bingham plastic with a yield shear stress necessary to begin shearing movement, and when moving has a constant increase of shear stress per unit increase of shear rate. This constant increase is known as the plastic viscosity. Yield stresses may be in the range 5 to 200 Pa and the plastic viscosity in the range 0.1 to 5 Pa s.

As stated the speed of the material through the paste combined with the vibration as described, causes the paste to impregnate between the material fibres such as into the pores in the material and/or between the fibres, preferably fully through the thickness of the material but at least 50% into the thickness of the material, or 60% or 70%, or 80% or 90% into the thickness of the material. In some embodiments preferably at least about 5 gm/cm$^3$ or at least about 4.5 gm/cm$^3$ or at least about 3.5 gm/cm$^3$ or at least about 3 gm/cm$^3$ or at least about 2.5 gm/cm$^3$ or at least about 2 gm/cm$^3$ or at least about 1.8 gm/cm$^3$ of paste is impregnated into (is contained between outer surfaces of) the material, over at least 70% of the volume of the material.

In some embodiments the contact time between the material and the paste is less than 1 second, or at least about 1 second or at least about 5 seconds or at least about 10 seconds and/or not more than about 30 seconds or not more than about 60 seconds. The material may be drawn through the tank continuously or in steps (semi-continuously) in which a part of the continuous length of the fibre material is stationary in the paste under vibration for a period, before the fibre material is stepped forward to introduce a next part of the fibre material into the tank.

Preferably the total depth of paste above and below the fibre material is at least about two or five or ten times the thickness of the fibre material or more, and preferably the depth or 'head' of paste above the fibre material is at least about two or five times the thickness of the fibre material or more.

At or adjacent the exit aperture 6 of the tank a scraper edge or edges, or a roller or rollers, or a blade or blades (such as air blades), or similar, are provided, across the aperture above and/or below the aperture to remove paste from both upper and lower planar surfaces of the fibre material before or after it exits the bath so that the pasted material has a desired predetermined thickness. In some embodiments the thickness of the pasted electrode through the plane is less than 5 mm, less than 3 mm, less than 2.5 mm or less than 2 mm thick. FIG. 25 schematically shows upper scraper plate 607a which extends across the exit aperture above the fibre material and scraper plate 607b which extends across the exit aperture below the fibre material. Ideally scraping occurs whilst in the tank where the paste is still fluid.

Referring to FIGS. 26 to 30 an embodiment of a machine for electrode paste impregnation generally as described above comprises paste tank 620 mounted to base 622, with lid 621 which closes the tank during machine operation but is removable for access to the interior of the machine at downtimes. Electric motors 623 each drive an eccentric mounted mass to rotate (flywheel weight), and are fixed to a chassis 624 beneath the tank 620 but coupled through the tank bottom wall to vibrate plate 625 within the tank which covers most of the bottom of the tank, and which during machine operation imparts vertical vibration to a mass of paste. Preferably the mass of paste fills the tank to a level such that as the fibre material passes through the tank the paste is at least at the level of the fibre. Although generally the mass of paste is at least one or at least two thicknesses above the height of the fibre material to ensure the fabric is substantially submerged in the paste as it moves through the tank. The chassis 624 is carried by the base frame 622 at each corner by spring mounts 626. Thus the tank 620 is rigidly fixed to the base frame 622 while the chassis 624 is coupled to vibration plate 625 and carrying vibrators 623 is non-rigidly (at least vertically) mounted. A fibre material feed system with drivers, in this embodiment nip rollers 627 on the exit side of the paste machine in the machine direction, is provided to move, for example by drawing, the fibre material through the interior of tank 620 under tension. The nip rollers 627 contact opposite faces of the fibre material on either side along narrow lengthwise edges of the fibre material. Transverse entry and exit apertures generally indicated at 628 and 629 in the tank, through which the unpasted material enters the tank and the pasted material exits the tank, are defined as slots between leading edges of plates 628a and 628b and 629a and 629b which just contact the upper and lower surfaces of the fibre material as it moves past, to prevent paste leakage. The plates may be adjustably mounted, for example by threaded adjustment mounts 630 (see FIG. 27 in particular) to enable fine adjustment of the size of the entry and exit slots. The exit plates 629a and 629b also act as scrapers above and/or below the exit aperture to remove substantially any excess paste from both upper and lower surfaces of the fibre material on exiting the tank. A reticulation system can be provided to capture this excess to recycle the same back into a feeding tank. The reticulation system may be provided by a drip tray or the like with a belt system feeding the excess paste into the tank. Within the tank, elements comprising bars 631, spaced in the machine direction, extend transversely across the tank immediately above or below or both, the path of the fibre material, which act to stabilise the fibre material to limit movement of the fibre material during machine operation as the paste is vibrated. The bars further act to provide shearing surfaces when the paste is vibrated to assist with keeping the fluid viscosity low, and to enable the eruptions to occur at the fluid/air interface.

In operation the tank is filled with paste to at least above the upper bars 631, and the paste level is maintained at this level as the machine operates by a paste supply system (not shown) including a pump, paste level sensor, and controller which operate the pump as required to maintain the paste level in the tank, preferably including an air space above the surface of the paste in the tank. The nip rollers 627 are under control of the machine controller so that the nip rollers 627 draw fibre material CF, for example from a feed out spool (not shown in FIGS. 26-30), through the interior of tank, while the vibrators 623 also under control of the machine controller as to speed and thus vibration frequency and energy, operate to vibrate the plate 625 and thus the mass of paste in the tank. Vibration of the paste according to the parameters described previously, causes the paste to impregnate into the fibre material as it passes through the tank, and excess paste is removed from the fibre material surfaces as it exits the tank by scraper bars 629a and 629b, so that a continuous length of pasted fibre material, without a paste 'skin' on either surface, is produced. The pasted material may be taken up after it exits the tank, on a take up spool, or fed directly to the next stage of an electrode or battery manufacturing process or plant, where the pasted material is cut to individual electrode lengths or groups of electrodes.

The above described alternative electrode paste impregnation may be defined as in broad terms a method for impregnating an active paste into a fibre material in the manufacture of an electrode of a lead acid battery or cell, which comprises moving a continuous length of fibre material through a paste that is subjected to vibration or moving a paste that is subjected to vibration relative to a continuous length of fibre material, to aid in the impregnation of the fibre material by the paste. Typically the method comprises moving the continuous length of fibre material through the paste.

The 'moving' may comprise moving the fibre material through the paste that is subjected to vibration or moving a paste that is subjected to vibration relative to the fibre material, either at a substantially steady speed, or in steps.

In further embodiments the paste is subjected to vibration of frequency at least about 20 Hz with an amplitude of at least about 0.5 mm. In some embodiments, the method comprises a maximum contact residence time of the fibre material with the paste before the paste that is subjected to the vibration of less than about 30 seconds. The above described alternative electrode paste impregnation may also be defined as in broad terms a method for impregnating an active paste into a fibre material in the manufacture of an electrode of a lead-acid battery or cell, which comprises contacting the fibre material with the paste and subjecting the paste to vibration of frequency at least about 20 Hz with an amplitude of at least 0.5 mm, applied to the paste or the fibre material or both, to aid impregnation of the fibre material by the paste. The method may comprise subjecting the paste to vibration of frequency at least about 40 Hz. The method may comprise subjecting the paste to vibration with an amplitude of at least about 1 mm or at least about 2 mm. The method may comprise a minimum contact residence time of the fabric with a non-vibrating portion of the paste of less than 30 seconds, or less than 20 seconds, or less than 10 seconds, or less than 5 seconds, or less than 1 second. Alternatively, the method may comprise commencing vibrating the paste prior to the fabric entering the vibrated paste. The method may comprise subjecting the fibre material and/or the paste to vibration while immersing the fibre material in the paste. The method may comprise maintaining the fibre material under tension, preferably a tension less than the tensile strength of the fibre material. The tension may be measured across the width of the fabric in the machine direction, or substantially perpendicular to the machine direction (being along the length of the fibre material) or in both directions. The method may comprise subjecting the fibre material and/or the paste to vibration while drawing the fibre material through the paste. The method may comprise moving the fibre material through the paste at a speed of at least about 3 mm/second. The method may comprise contacting the fibre material with the paste for a time of at least about 1 second or at least about 5 seconds or at least about 10 seconds, and/or not more than about 30 seconds, and/or not more than about 60 seconds.

Example

The following description of pasting experimental work is given by way of example.

Carbon felt described below was pasted using the pasting methodology of the present invention, utilising a confinement zone and repeating the same pasting methodology of the present invention without a confinement zone.

Carbon Felt:

The felt was made from polyacrylonitrile (PAN) fibres that was stabilised and carbonised from around 1000 to 1600 degrees C. with 9 micron diameter fibres. The felt thickness was approximately 2.6 mm with a carbon mass loading of 225 g/m². The volume fraction of carbon in the felt was around 0.05 or 5% solid volume fraction.

Paste Composition:

The paste was made with leady oxide powder obtained from Hammond Expanders and mixed with a planetary mixer, adding solids continuously to the liquids over around 10 min, with further stirring over another 10 minutes. The paste had a density of 3.4 to 3.5 g/cm3, a mass fraction of solids of 0.78 and a volume fraction of solids of 0.26. The rheology of the paste was measured with a concentric bob in a tube rheometer (Rheomat 100) and showed a Bingham behaviour with yield stress 15 Pa and plastic viscosity 0.8 Pa s.

Pasting Method with Confinement Using a Continuous Length of Carbon Fibre:

A continuous strip of 80 mm wide carbon felt was fed into a pasting application apparatus generally shown in FIG. 1, where the carbon felt was fed onto a stationary plate and then pulled past a paste applicator that distributed paste, as described above, onto its surface (the applicator itself was touching the surface of the carbon felt) which was then almost immediately passed under the ultrasound horn that pressed into the surface of the carbon felt. The paste was therefore confined under pressure between the ultrasound horn and the applicator. The fabric was then pulled through the confinement zone of the paste application stage by a pulley system set to an approximate speed of 100 mm/sec. The ultrasound vibration was set to a frequency of 20 kHz and an amplitude of 28 μm.

Fabric exiting the apparatus had been fully penetrated evenly by the paste in the depth, width and along the length (where both the paste and ultrasound horn had been) directions of the continuous length of carbon felt.

Pasting Method without Confinement Using a Continuous Length of Carbon Fibre:

Another strip of carbon felt as described above was used and the same paste was applied to the carbon felt. The ultrasound vibration was set to the same parameters. Similarly the carbon felt was fed onto a plate where the applicator applied paste onto the carbon felt and the ultrasound horn was turned on. However the applicator and ultrasound horn did not press into the surface of the carbon felt, albeit the same pressure and vibration as above was still being applied.

Fabric exiting the apparatus did not have any of the paste penetrating into the depth, width or length of the continuous length of carbon felt. It was further observed that during the time the ultrasound horn was being vibrated, the paste was emitted sideways from under the horn and above the carbon fibre surface as a fine droplet spray.

The foregoing describes the invention including preferred forms thereof and alterations and modifications as will be obvious to one skilled in the art are intended to be incorporated within the scope hereof as defined in the accompanying claims.

The invention claimed is:

1. A method for impregnating an active paste into a fibre sheet material in manufacture of an electrode of a lead acid battery or cell, which comprises moving a fibre sheet material through a confined pasting zone of a paste application stage, the fibre sheet material having a major plane, length in said major plane width in said major plane and between lengthwise edges of the fibre sheet material, and thickness perpendicular to said major plane the fibre sheet material also having a solids volume fraction of greater than 1%, the confined pasting zone defined between an upper surface above the fibre sheet material, a lower surface below the fibre sheet material, and left and right side walls at lengthwise side edges of the fibre sheet material, the upper surface, lower surface, and left and right side walls extending in the direction of said moving of the fibre sheet material, also containing in the confined pasting zone a Pb-based paste and continuously supplying paste to the confined pasting zone, while vibrating the paste in the confined pasting zone, and maintaining the confined pasting zone full of vibrating paste under pressure and preventing escape of paste impregnating the fibre sheet material from the lengthwise edges of the fibre sheet material to continuously impregnate the paste through a major surface of the fibre sheet material moving through the confined pasting zone, and into and through the thickness of the fibre sheet material moving through the confined pasting zone.

2. A method for impregnating an active paste into a fibre sheet material in manufacture of an electrode of a lead acid battery or cell, which comprises moving a fibre sheet material through a confined pasting zone of a paste application stage, the fibre sheet material having a major plane, length in said major plane width in said major plane and between lengthwise edges of the fibre sheet material, and thickness perpendicular to said major plane, the fibre sheet material also having an interfibre spacing up to 100 microns, the confined pasting zone defined between an upper surface above the fibre sheet material, a lower surface below the fibre sheet material, and left and right side walls at lengthwise side edges of the fibre sheet material, the upper surface, lower surface and left and right side walls extending in the direction of said moving of the fibre sheet material, also containing in the confined pasting zone a Pb-based particle paste and continuously supplying paste to the confined pasting zone, while vibrating the paste in the confined pasting zone and maintaining the confined pasting zone full of vibrating paste under pressure and preventing escape of paste impregnating the fibre sheet material from the lengthwise edges of the fibre sheet material to continuously impregnate the paste through a major surface of the fibre sheet material moving through the confined pasting zone, and into and through the thickness of the fibre sheet material moving through the confined pasting zone.

3. A method according to claim 1 including continuously supplying paste to the confined pasting zone and applying the pressure on the vibrating paste through the paste supply.

4. A method according to claim 1 wherein the confined pasting zone has a height perpendicular to the plane of the fibre sheet material which reduces in the machine direction of said moving of the fibre sheet material.

5. A method according to claim 1 wherein the confined pasting zone has an entry across the direction of said moving of the fibre sheet material and a smaller slot-shaped exit across said direction.

6. A method according to claim 1 wherein the confined pasting zone is defined at least in part by vibrator which vibrates the paste in the confined pasting zone.

7. A method according to claim 1 including allowing air to escape from within the fibre sheet material during pasting.

8. A method according to claim 1 including compressing the fibre sheet material while impregnating the fibre sheet material.

9. A method according to claim 1 wherein the fibre sheet material comprises a metal lug for external electrical connection along at least one edge.

10. A method according to claim 1 comprising after drawing the fibre sheet material through the paste application stage, cutting the pasted fibre sheet material to form multiple individual electrode elements, drying the pasted fibre sheet material[M]$_2$ cleaning any conductive lug of any paste and trimming or stamping any lug of any excess lug material or to cut out any excess lug material from the lug.

11. A method according to claim 1 including also vibrating the paste by subjecting the paste to ultrasound vibration.

12. A machine for impregnating an active Pb-based particle paste into a fibre sheet material in manufacture of an electrode of a lead acid battery or cell, the fibre sheet material having a major plane, length in said major plane, width in said major plane and between lengthwise edges of the fibre sheet material, and thickness perpendicular to said major plane, wherein the machine comprises:

a paste application stage comprising a confined pasting zone thereof to receive paste continuously supplied to the confined pasting zone and which confined pasting zone prevents escape of paste from the lengthwise edges of the fibre sheet material, the confined pasting zone defined between an upper surface, a lower surface, and left and right side walls, a fibre sheet material feed system arranged to move the fibre sheet material in a machine direction lengthwise through the confined pasting zone with said upper surface and lower surface above and below the major plane of the fibre sheet material and said left and right side walls adjacent the lengthwise edges of the fibre sheet material, a vibrator to vibrate the paste in the confined pasting zone, and a pressure supply arranged to maintain the confined pasting zone full of vibrating paste under pressure, to continuously impregnate the paste through a major surface of the fibre sheet material moving through the confined pasting zone, and into and through the thickness of the fibre sheet material.

13. A machine according to claim 12 wherein the confined pasting zone is defined at least in part by the vibrator which vibrates the paste in the confined pasting zone.

14. A method according to claim 2 including continuously supplying paste to the confined pasting zone and applying the pressure on the vibrating paste through the paste supply.

15. A method according to claim 2 wherein the confined pasting zone has a height between said upper surface and said lower surface of the confined pasting zone which height reduces in the machine direction.

16. A method according to claim 2 wherein the confined pasting zone has an entry across the machine direction and a smaller slot-shaped exit across the machine direction.

17. A method according to claim 2 wherein the confined pasting zone is defined at least in part by a vibrator which vibrates the paste in the confined pasting zone.

18. A method according to claim 2 including allowing air to escape from within the fibre sheet material during pasting.

19. A method according to claim 2 including compressing the fibre sheet material while impregnating the fibre sheet material.

20. A method according to claim 2 wherein the fibre sheet material comprises a metal lug for external electrical connection along at least one edge.

21. A method according to claim 2 comprising after drawing the fibre sheet material through the paste application stage, cutting the pasted fibre sheet material to form multiple individual electrode elements, drying the pasted fibre sheet material, cleaning any conductive lug of any paste and trimming or stamping any lug of any excess lug material or to cut out any excess lug material from the lug.

22. A method according to claim 2 including also vibrating the paste by subjecting the paste to ultrasound vibration.

23. A method according to claim 1 wherein the lower surface of the confined pasting zone comprises a surface of a conveyor which carries the fibre sheet material through the confined pasting zone.

24. A method according to claim 2 wherein the lower surface of the confined pasting zone comprises a surface of a conveyor which carries the fibre sheet material through the confined pasting zone.

25. A machine according to claim 12 wherein said lower surface of the confined pasting zone comprises a surface of a conveyor which carries the fibre sheet material through the confined pasting zone.

* * * * *

UNITED STATES PATENT AND TRADEMARK OFFICE
CERTIFICATE OF CORRECTION

PATENT NO.         : 10,903,480 B2
APPLICATION NO.    : 16/061005
DATED              : January 26, 2021
INVENTOR(S)        : John Abrahamson et al.

It is certified that error appears in the above-identified patent and that said Letters Patent is hereby corrected as shown below:

In the Claims

Column 25:
Line 35 (Claim 4, Line 3), after "the" delete "machine";
Line 56 (Claim 10, Line 5), after "material" delete "[M]2" and insert -- , --;
Line 57 (Claim 10, Line 6), after "paste" insert -- , --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*